(12) United States Patent
Ravikumar et al.

(10) Patent No.: US 8,515,964 B2
(45) Date of Patent: Aug. 20, 2013

(54) METHOD AND SYSTEM FOR FAST SIMILARITY COMPUTATION IN HIGH DIMENSIONAL SPACE

(75) Inventors: Shanmugasundaram Ravikumar, Berkeley, CA (US); Anirban Dasgupta, Berkeley, CA (US); Tamas Sarlos, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 192 days.

(21) Appl. No.: 13/189,696

(22) Filed: Jul. 25, 2011

(65) Prior Publication Data
US 2013/0031059 A1    Jan. 31, 2013

(51) Int. Cl.
*G06F 17/30* (2006.01)

(52) U.S. Cl.
USPC ........... 707/747; 707/711; 707/769; 707/661; 707/E17.002; 707/E17.008

(58) Field of Classification Search
USPC .................................. 707/661–673, 705–780
See application file for complete search history.

(56) References Cited

U.S. PATENT DOCUMENTS

| | | | | |
|---|---|---|---|---|
| 8,244,767 B2* | 8/2012 | Ancin et al. | .................. | 707/791 |
| 8,363,961 B1* | 1/2013 | Avidan et al. | .................. | 382/225 |
| 2009/0216755 A1* | 8/2009 | Itamar | ............................... | 707/5 |
| 2010/0077015 A1* | 3/2010 | Eshghi et al. | .................. | 708/400 |
| 2010/0179933 A1* | 7/2010 | Bai et al. | .......................... | 706/12 |
| 2010/0191734 A1* | 7/2010 | Rajaram et al. | ............... | 707/739 |

OTHER PUBLICATIONS

Ailon, Nir et al. "The Fast Johnson-Lindenstrauss Transform and Approximate Nearest Neighbors", 2009, SIAM Journal of Computing, vol. 39. No. 1, pp. 302-322.*

* cited by examiner

*Primary Examiner* — Fred I Ehichioya
*Assistant Examiner* — Michelle Owyang
(74) *Attorney, Agent, or Firm* — Dentons US LLP

(57) ABSTRACT

Method, system, and programs for computing similarity. Input data is first received from one or more data sources and then analyzed to obtain an input feature vector that characterizes the input data. An index is then generated based on the input feature vector and is used to archive the input data, where the value of the index is computed based on an improved Johnson-Lindenstrass transformation (FJLT) process. With the improved FJLT process, first, the sign of each feature in the input feature vector is randomly flipped to obtain a flipped vector. A Hadamard transformation is then applied to the flipped vector to obtain a transformed vector. An inner product between the transformed vector and a sparse vector is then computed to obtain a base vector, based on which the value of the index is determined.

9 Claims, 20 Drawing Sheets

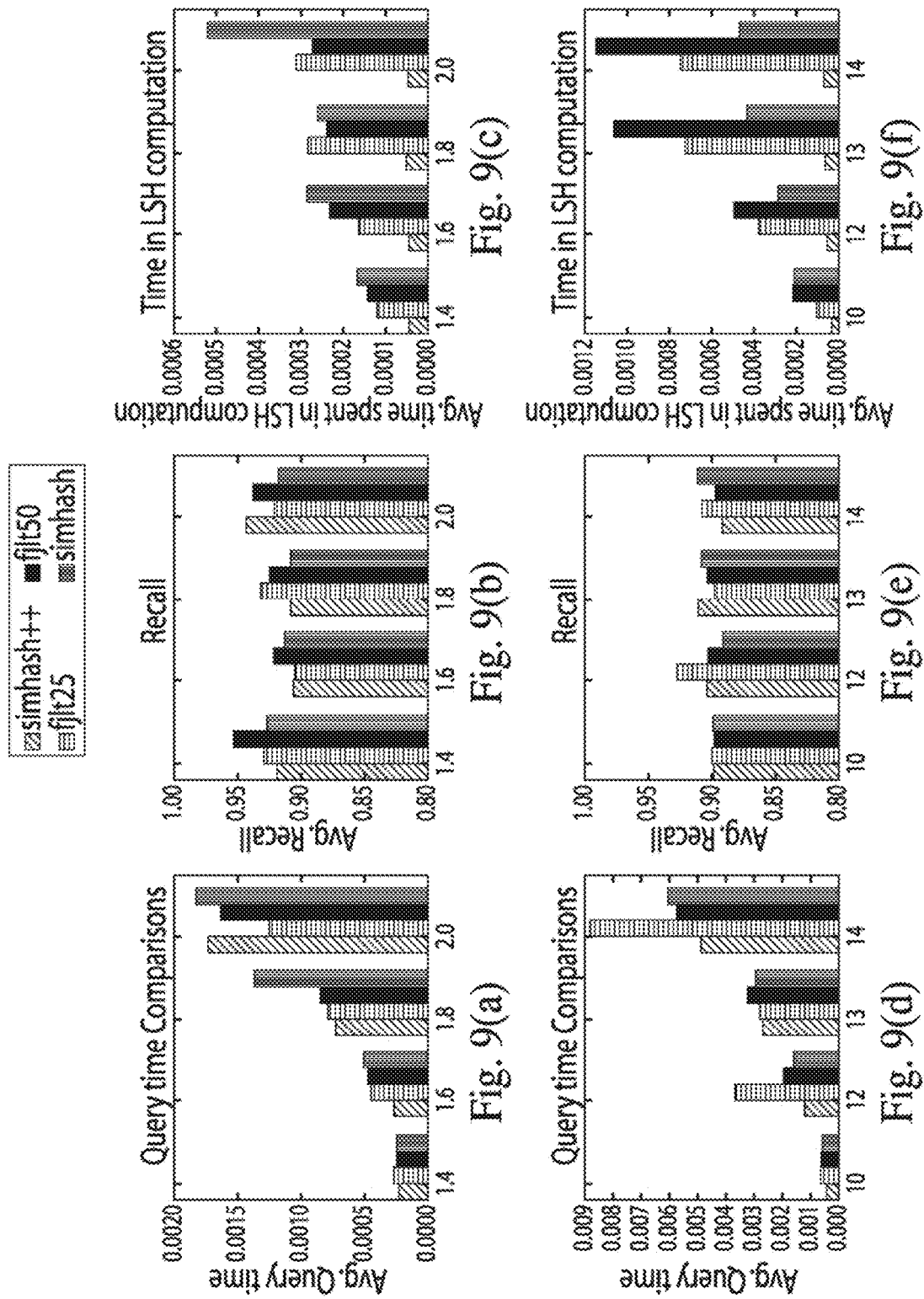

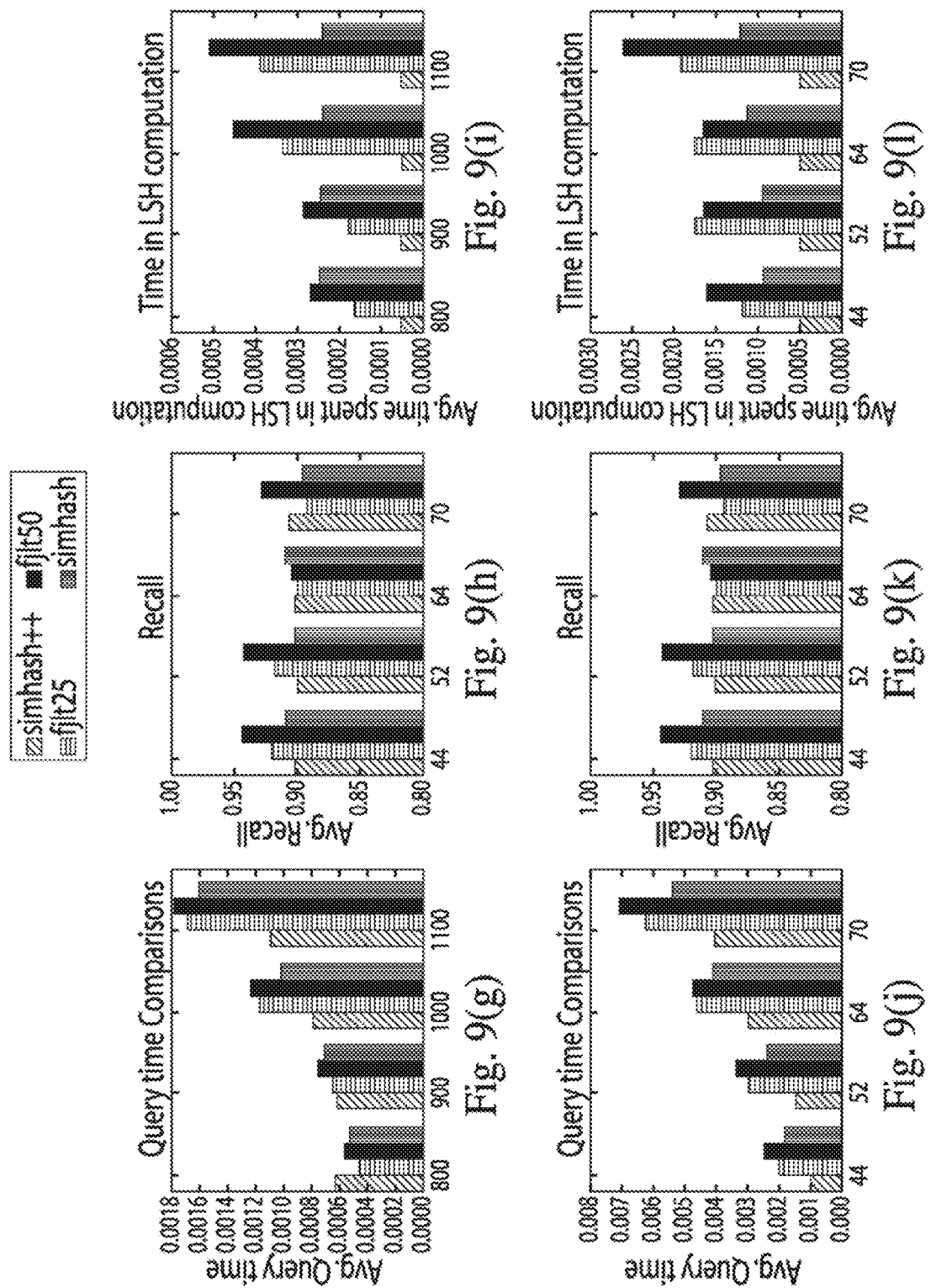

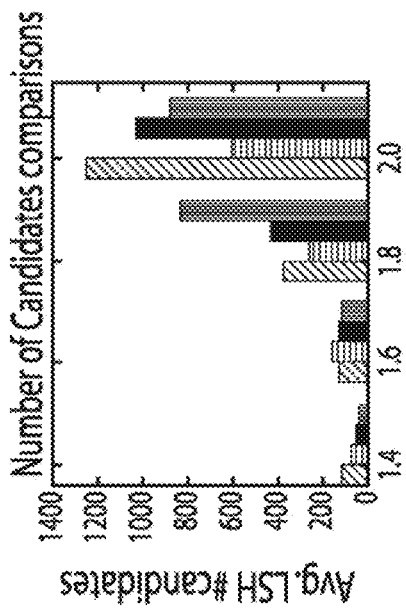
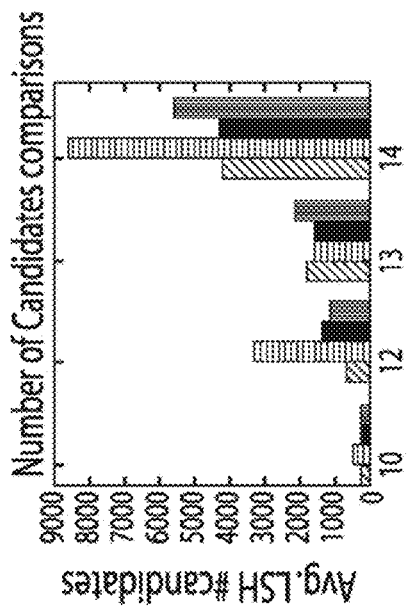
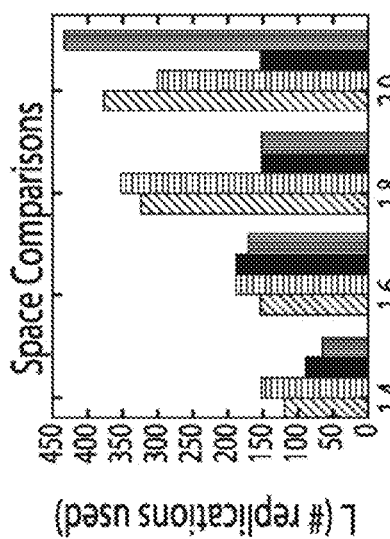
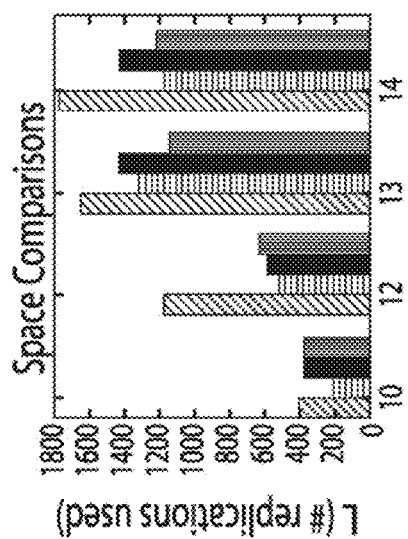
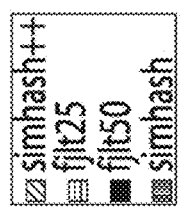
Fig. 10(a)  Fig. 10(b)  Fig. 10(c)  Fig. 10(d)

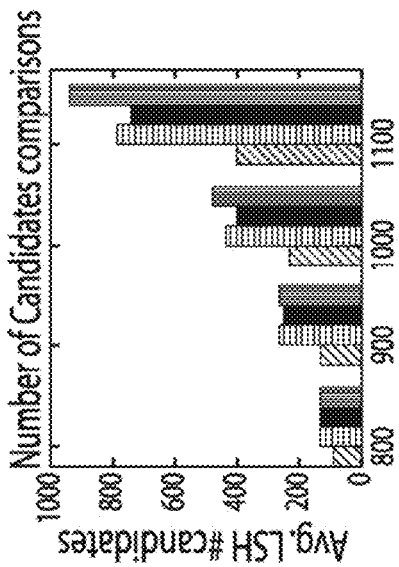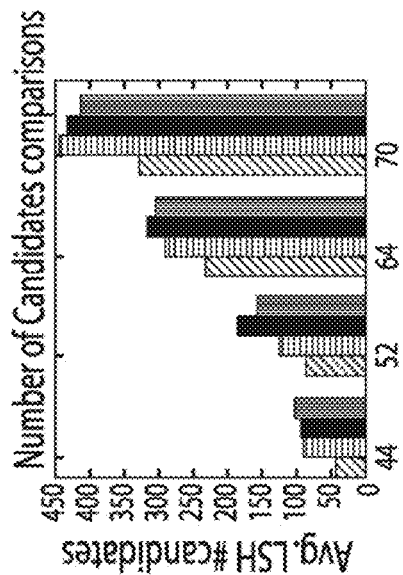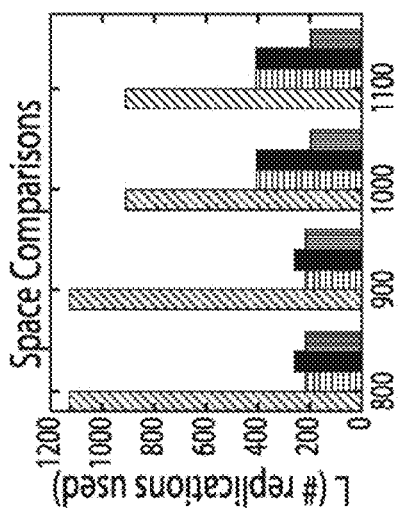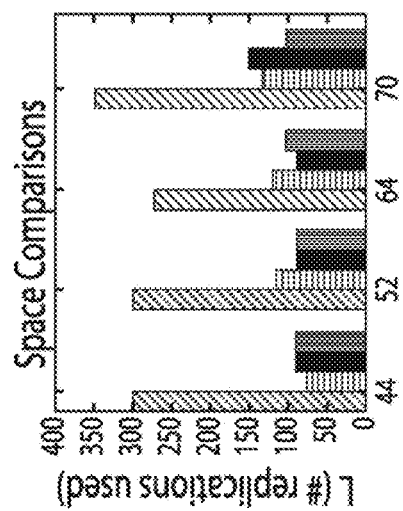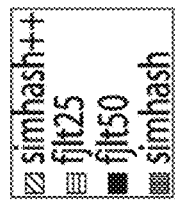
Fig. 10(e) Fig. 10(f) Fig. 10(g) Fig. 10(h)

METHOD AND SYSTEM FOR FAST SIMILARITY COMPUTATION IN HIGH DIMENSIONAL SPACE

BACKGROUND

1. Technical Field

The present teaching relates to methods, systems and programming for data processing. Particularly, the present teaching is directed to methods, systems, and programming for computing measures to be used to identify similar data.

2. Discussion of Technical Background

Locality sensitive hashing (LSH) is a basic primitive in large-scale data processing algorithms that are designed to operate on objects (with features) in high dimensions. The idea behind LSH is to construct a family of functions that hash objects into buckets such that objects are similar will be hashed to the same bucket with high probability. Here, the type of the objects and the notion of similarity between objects determine the particular hash function family. Typical instances include utilizing a Jaccard co-efficient as similarity when the underlying objects are sets and a cosine/angle measure as similarity when the underlying objects are vectors in the Euclidean space.

Using this technique, large-scale data processing problems are made more tractable. For instance, in conjunction with standard indexing techniques, it becomes possible to do nearest-neighbor search efficiently: given a query, hash the query into a bucket, use the objects in the bucket as candidates, and ranking the candidates according to the similarity of each candidate to the query. Likewise, popular operations such as approximate nearest neighbor, near-duplicate detection, all-pairs similarity, similarity join/record-linkage, temporal correlation, are simplified.

An example of this approach is a very simple locality sensitive hashing (LSH) approach: the hash of an input vector is the sign of its inner product with a random unit vector, commonly termed "SimHash" (similarity hashing meaning similar features hash to similar values—see http://www.fatvat.co.uk/2010/09/lets-get-hashing.html or "Similarity Estimation Techniques from Rounding Algorithms" by Charikar, Moses S., Proceedings of $34^{th}$ STOC, pages 380-388, 2002). It can be shown that the probability of the hashes of two vectors agreeing is a function of the angle between the underlying vectors. To improve the accuracy of this basic method, multiple random unit vectors are used. However, this approach requires more space and yields longer query time.

There have been efforts to make SimHash more efficient and practical. One method utilizes an entropy-based LSH to (provably) reduce the space requirements. In this scheme, in addition to considering the bucket corresponding to the query, buckets corresponding to perturbed versions of the query are also considered. Unfortunately, while the space requirements are reduced, the query time is considerably increased. Another method utilizes a careful probing heuristic to look up multiple buckets that have a high probability of containing the nearest neighbors of a query. They obtain both space and query time improvements, but are not able to offer any provable guarantees of performance.

Currently technologies fall into three main categories: (1) data structures and indexing for similarity search, (2) LSH and related methods, and (3) the use of FFT-like methods for dimensionality reduction. There have been several indexing data structures proposed for nearest-neighbor search and approximate nearest neighbor search. Examples include R-tree, K-D tree, SR-tree, VA-file, A-tree, and AV-tree. However, these index structures do not scale well with the dimension of the data.

In addition, attempts have been made to obtain a fast version of a Johnson/Lindenstrauss transform. Furthermore, a version of the Johnson/Lindenstrauss theorem using circulant matrices and Gaussian random variables has also been developed. It is unclear, however, if this method can be adapted to either a Hadamard transform setting or to the angle setting (as opposed to the distance setting in the Johnson/Lindenstrauss theorem). Therefore, a desire exists to develop a faster similarity computation scheme to make data retrieval from large archives more feasible.

SUMMARY

The teachings disclosed herein relate to methods, systems, and programming for content processing. More particularly, the present teaching relates to methods, systems, and programming for heterogeneous data management.

one example, a method, implemented on a machine having at least one processor, storage, and a communication platform connected to a network for information retrieval is disclosed by which input data are received from one or more data sources before the input data are analyzed to obtain an input feature vector characterizing the input data. An index is then generated based on the input feature vector. The input data are then archived based on a value of the index for the input data, which is computed based on an improved fast Johnson-Lindenstrass transformation (FJLT) process. The DJLT process includes the steps of randomly flipping the signs of the features in the input feature vector to obtain a flipped vector, applying a Hadamard transformation to the flipped vector to obtain a transformed vector, computing an inner product between the transformed vector and a sparse vector to obtained a base vector, and determining the value of the index based on the base vector.

In another example, a method, implemented on a machine having at least one processor, storage, and a communication platform connected to a network, for information search is disclosed. Input data are first received from one or more data source. The received input data are analyzed to obtain an input feature vector that characterizes the input data. An index of the input data is also generated based on the input feature vector. The input data are them archived based on a value of the index, computed using an improved similarity hash (SimHash++) process, which includes the steps of randomly flipping the signs of the features in the feature vector to obtain a flipped vector, applying a first Hadamard transformation to the flipped vector to obtain a first transformed vector, multiplying the first transformed vector with an independent Gaussian transformation to obtain a second transformed vector, applying a second Hadamard transformation to the second transformed vector to form a base vector, and determining the value of the index for the input data based on the base vector.

In a different example, a method, implemented on a machine having at least one processor, storage, and a communication platform connected to a network, for computing a hash value is disclosed. In this method, an input vector x of d dimensions is first received. A multiplication HDx of the input vector x is obtained via a fast Walsh-Hadamard transform (FWHT) Hx obtained based on a Hadamard matrix H as well as a diagonal matrix D, where both the Hadamard matrix and the diagonal matrix is d×d dimension and each element in the diagonal matrix, $D_{ii}$, is a Bernoulli random variable. A k by d sub-sampling matrix, where k is smaller than d, is obtained such that each element in the sub-sampling matrix, $M_{ij}$, is zero with a probability (1−q) and a random variable drawn with probability q from a normal distribution of N(0, 1/q). A multiplication MHDx is then computed and a hash value of the input vector x is output based on MHDx.

In a different example, another method, implemented on a machine having at least one processor, storage, and a communication platform connected to a network, for computing a hash value is disclosed. An input vector x of d dimensions is first received to obtain a multiplication HDx of the input vector x via a fast Walsh-Hadamard transform (FWHT) Hx obtained based on a Hadamard matrix H as well as a diagonal matrix D, where both the Hadamard matrix and the diagonal matrix is d×d dimension and each element in the diagonal matrix, $D_{ii}$, is a Bernoulli random variable. An ith sub-sampling matrix $M_i$ of dimension k×d, where k is smaller than d, is obtained such that each element in the sub-sampling matrix $M_i$ is zero with a probability (1−q) and a random variable drawn with probability q from a normal distribution of N(0, 1/q). A multiplication $M_i$HDx is computed and a k dimensional vector is obtained where each coordinate of the B vector is drawn from a uniform distribution over [0, w]. Then ($M_i$HDx+B)/w is output as an ith locality sensitive hash value of the input vector.

In a different example, a system for computing a fast Johnson/Lindenstrass transformation (FJLT) hash value is disclosed, which includes a communication platform capable of being used to receive an input vector x of d dimensions, an Hx generator configured for obtaining a multiplication HDx of the input vector x, via a fast Walsh-Hadamard transform (FWHT) Hx obtained based on a Hadamard matrix H as well as a diagonal matrix D, where both the Hadamard matrix and the diagonal matrix is d×d dimension and each element in the diagonal matrix, $D_{ii}$, is a Bernoulli random variable, an M matrix generator configured for obtaining a k by d sub-sampling matrix, where k is smaller than d, such that each element in the sub-sampling matrix, $M_{ij}$, is zero with a probability (1−q) and a random variable drawn with probability q from a normal distribution of N(0, 1/q), an FJLT hash value generator configured for computing a multiplication MHDx and generating and outputting a hash value of the input vector x based on MHDx, wherein the value of q is determined either empirically or based on an operational parameter δ.

In a different example, a system for computing a fast Johnson-Lindenstrass transformation (FJLT) hash value, which includes a communication platform configured for receiving an input vector x of d dimensions, an Hx generator configured for obtaining a multiplication HDx of the input vector x, via a fast Walsh-Hadamard transform (FWHT) Hx obtained based on a Hadamard matrix H as well as a diagonal matrix D, where both the Hadamard matrix and the diagonal matrix is d×d dimension and each element in the diagonal matrix, $D_{ii}$, is a Bernoulli random variable, an M matrix generator configured for obtaining an ith sub-sampling matrix $M_i$ of dimension k×d, where k is smaller than d, such that each element in the sub-sampling matrix $M_i$ is zero with a probability (1−q) and a random variable drawn with probability q from a normal distribution of N(0, 1/q), an FJLT hash value generator configured for computing a multiplication $M_i$HDx, a B vector generator configured for computing a k dimensional vector where each coordinate of the B vector is drawn from a uniform distribution over [0, w], generating and outputting ($M_i$HDx+B)/w as an ith locality sensitive hash value of the input vector x.

In a different example, a system for computing a hash value is disclosed, which includes a communication platform configured for receiving an input vector x of d dimensions, an Hx generator configured for obtaining a multiplication HDx of the input vector x, via a fast Walsh-Hadamard transform (FWHT) Hx derived based on a Hadamard matrix H as well as a diagonal matrix D, where both the Hadamard matrix and the diagonal matrix is d×d dimension and each element in the diagonal matrix, $D_{ii}$, is a Bernoulli random variable, a G matrix generator configured for obtaining a d×d diagonal Gaussian matrix, where each diagonal element in the diagonal Gaussian matrix, $G_{ii}$, is an independently distributed random variable drawn from a normal distribution N(0,1), a P matrix generator configured for obtaining a random permutation matrix P, and abash value generator configured for generating and outputting a hash value of the input.

Other concepts relate to software for implementing the generation of explanations for relationships. A software product, in accord with this concept, includes at least one machine-readable non-transitory medium and information carried by the medium. The information carried by the medium may be executable program code data regarding parameters in association with a request or operational parameters, such as information related to a user, a request, or a social group, etc.

In one example, a machine readable and non-transitory medium having information recorded thereon for computing a fast Johnson-Lindenstrass transformation (FJLT) hash value, wherein the information, when read by the machine, causes the machine to perform a series of steps, including receiving, via the communication platform, an input vector x of d dimensions, obtaining, a multiplication HDx of the input vector x, via a fast Walsh-Hadamard transform (FWHT) Hx obtained used on a Hadamard matrix H as well as a diagonal matrix D, where both the Hadamard matrix and the diagonal matrix is d×d dimension and each element in the diagonal matrix, $D_{ii}$, is a Bernoulli random variable, obtaining, by an M matrix generator, a k by d sub-sampling matrix, where k is smaller than d, such that each element in the sub-sampling matrix, $M_{ij}$, is zero with a probability (1−q) and a random variable drawn with probability q from a normal distribution of N(0, 1/q), computing, by an FJLT hash value generator, a multiplication MHDx, and outputting, by the FJLT hash value generator, a hash value of the input vector x based on MHDx.

In one example, a machine readable and non-transitory medium having information recorded thereon for computing a fast Johnson-Lindenstrass transformation (FJLT) hash value, wherein the information, when read by the machine, causes the machine to perform a series of steps, including receiving, via the communication platform, an input vector x of d dimensions, obtaining, a multiplication HDx of the input vector x, via a fast Walsh-Hadamard transform (FWHT) Hx obtained based on a Hadamard matrix H as well as a diagonal matrix D, where both the Hadamard matrix and the diagonal matrix is d×d dimension and each element in the diagonal matrix, $D_{ii}$, is a Bernoulli random variable, obtaining, by an M matrix generator, an ith sub-sampling matrix $M_i$ of dimension k×d, where k is smaller than d, such that each element in the sub-sampling matrix $M_i$ is zero with a probability (1−q) and a random variable drawn with probability q from a normal distribution of N(0, 1/q), computing, by an FJLT hash value generator, a multiplication $M_i$HDx, obtaining, by a B vector generator, a k dimensional vector where each coordinate of the B vector is drawn from a uniform distribution over [0, w], and outputting, by the FJLT hash value generator, ($M_i$HDx+B)/w as an ith locality sensitive hash value of the input vector x.

In one example, a machine readable and non-transitory medium having information recorded thereon for computing a hash value, wherein the information, when read by the machine, causes the machine to perform a series of steps, including receiving, via the communication platform, an input vector x of d dimensions, obtaining, a multiplication HDx of the input vector x, via a fast Walsh-Hadamard transform (FWHT) Hx derived based on a Hadamard matrix H as well as a diagonal matrix D, where both the Hadamard matrix and the diagonal matrix is d×d dimension and each element in the diagonal matrix, $D_{ii}$, is a Bernoulli random variable, obtaining, by a G matrix generator, a d×d diagonal Gaussian matrix, where each diagonal element in the diagonal Gaussian matrix, $G_{ii}$, is an independently distributed random variable drawn from a normal distribution N(0,1), obtaining, by a P matrix generator, a random permutation matrix P, and outputting, by a hash value generator, a hash value of the input vector x based on HGPHDx.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIGS. 9(a)-9(l) show various experimental results obtained based on some embodiments of the present teaching;

FIGS. 10(a)-10(h) show various experimental results obtained based on some embodiments of the present teaching;

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of methods and systems for fast computation of different similarity measures. Since speed in information search and retrieval is crucial in light of massive amount of data made available, the improved methods of computing similarity or hash value for that purpose is fundamentally important which open up a wide possibility for their use in diverse settings. Potential applications are not limited to information information search and retrieval and other exemplary potential applications includes, but not limited to, de-duplication, clustering, similarity joins, all-pair similarity search, etc.

Figure 1A:
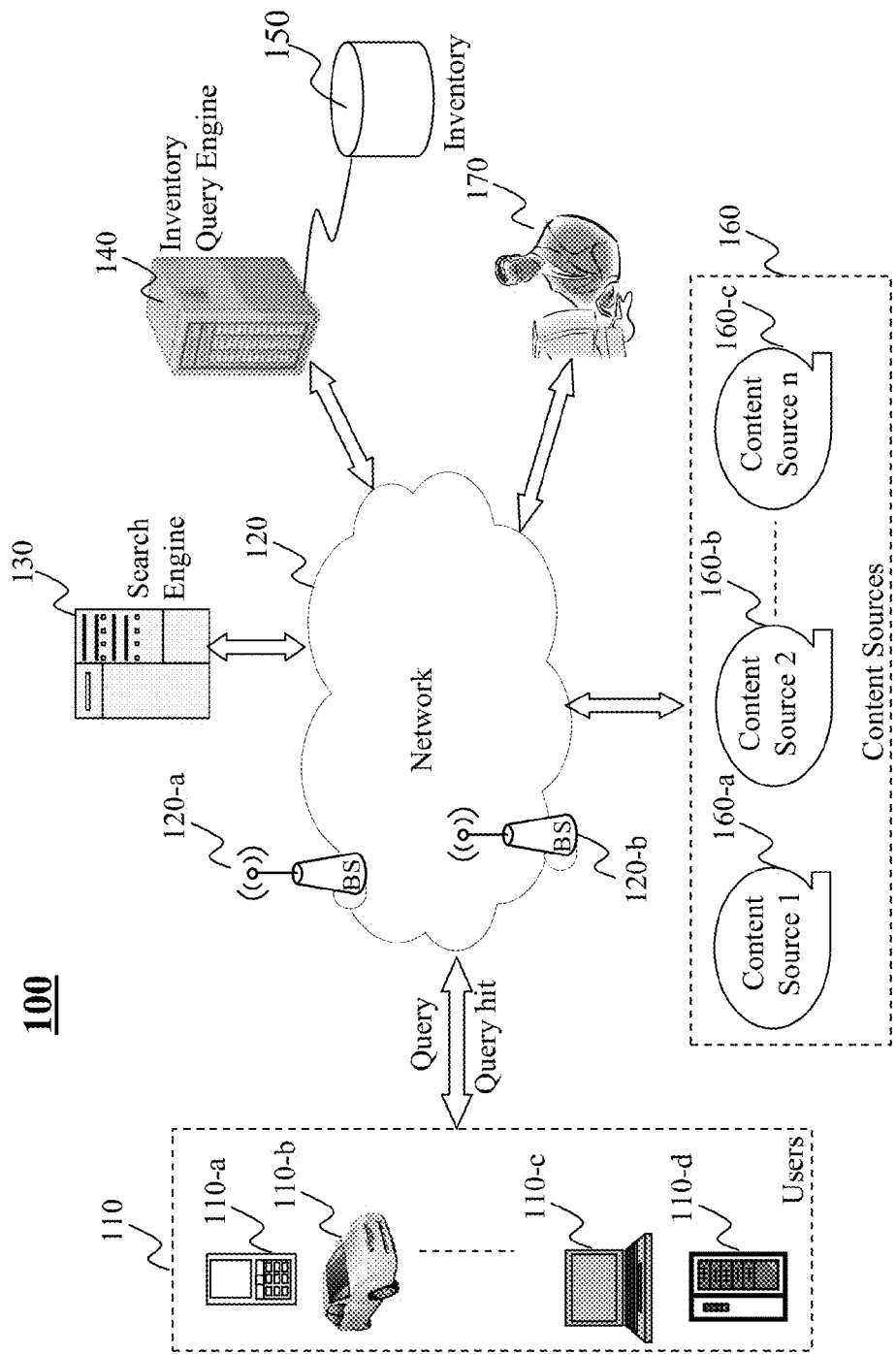
FIGS. 1(a)-1(b) are high level depiction of different system configurations in which fast similarity computation can be applied in information search and/or retrieval, according to an embodiment of the present teaching.
Figure 1B:
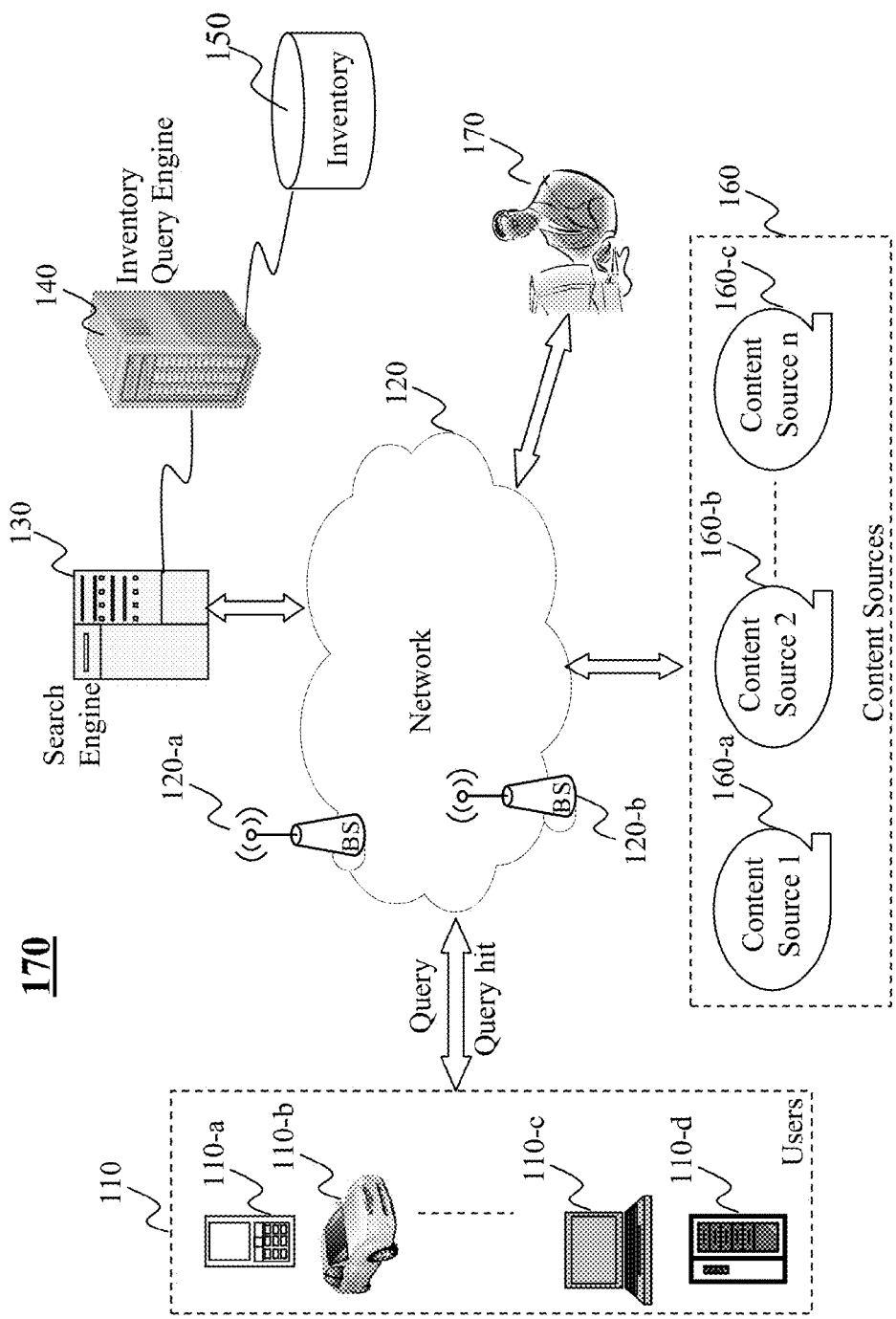

Motivated by this challenge, the teachings presented herein provide a system or service that utilizes improved approaches to compute similarity measures in order to speed up data search in information retrieval. FIGS. 1(a)-1(b) are high level depiction of different system configurations in which fast similarity computation can be applied in information search and/or retrieval, according to an embodiment of the present teaching. In FIG. 1(a), the exemplary system 100 includes users 110, a network 120, a search engine 130, data sources 160 including data source 1 160-a, data source 2 160-b, . . . , data source n 160-c, and an inventory query engine 140. The network 120 can be a single network or a combination of different networks. For example, a network can be a local area network (LAN), a wide area network (WAN), a public network, a private network, a proprietary network, a Public Telephone Switched Network (PSTN), the Internet, a wireless network, a virtual network, or any combination thereof. A network may also include various network access points, e.g., wired or wireless access points such as base stations or Internet exchange points 120-a, . . . , 120-b, through which a data source may connect to the network in order to transmit information via the network.

Users 110 may be of different types such as users connected to the network via desktop connections (110-d), users connecting to the network via wireless connections such as through a laptop (110-c), a handheld device (110-a), or a built-in device in a motor vehicle (110-b). A user may send a query to the search engine 130 via the network 120 and receive a query result from the search engine 130 through the network 120. The user's query may be handled by the search engine 130 which may then send a request for desired data to the inventory query engine 140 for search from the inventory database 150 the desired data.

To facilitate fast data retrieval, the inventory query engine 140 may analyze the data stored in the inventory database 150 and compute some measures for indexing purposes. During such indexing, the archived data may have corresponding indices that can be categorized into different buckets so that data whose indices fall within the same indexing bucket are considered somewhat similar. In searching for the desired data, the inventory query engine 140 may analyze the query data and also compute the same measures against the query data. Such computed measures for the query data are then used to map to a certain index bucket. In this manner, the archived data whose indices are in the same bucket will be used as candidates for the desired data. Further processing may be performed to select the desired data from such candidates.

When the inventory database 150, which can be centralized or distributed, archives massive amount of data, the speed at which the measures against different pieces of data, whether archived or query data, can be computed may significantly affect the performance of the entire system. While this system architecture depicted in FIG. 1(*a*) is commonly understood, the present teaching discloses fast method for computing the measures that are used to indexing and retrieve data. In some embodiments, once the inventory engine 140 identifies the desired data based on the query data, it forwards the desired data to the search engine 130. The search engine 130 may then generate a response based on the searched desired data and then forwarded from the search engine 830 to the user via the network 820.

In addition to a user at 110, a different type of user such as 170, which can be a system operator or an administrator, may also be able to interact with the inventory engine 140 for different administrative jobs such as building the indexing system for the entire inventory database 150. In some embodiments, user 170 may be classified to have a higher privilege to manage the inventory database 150 on more operational issues than user 110. For example, user 170 may be configured to be able to update the indexing scheme of the inventory database 150 or testing the inventory query engine 140. In some embodiments, the inventory query engine 140 and its inventory database 150 may be part of a third party service provider so that the search engine 130 and user 170 may be customers of the inventory query engine 140. In this case, each user (search engine operator or user 170) may configure separate data/process so that the service to different customers may be based on different data/process operational parameters to provide individualized services.

FIG. 1(*b*) presents a similar system configuration as what is shown in FIG. 1(*a*) except that the inventory query engine 140 is now configured as a backend system of the search engine 130. In this configuration, user 170 may become a customer of the search engine 130 and subscribes to specific inventory query related services which may be independent of or in addition to the search engine related services. In some embodiments, there may be yet another different system configuration in which the inventory query engine 140 may be deployed (now shown). In this embodiment, the user 170 is a backend operator of the search engine 130 and can interact with the inventory query engine 140 via an internal or proprietary network connection (not shown). It is noted that different configurations as illustrated in FIGS. 1(*a*)-1(*c*) can also be mixed in any manner that is appropriate for a particular application scenario.

FIG. 2(*a*) is a high level depiction of a high level system diagram of the inventory query engine 140, according to an embodiment of the present teaching. In this exemplary system, the inventory query engine 140 comprises three parts, one corresponding to the archive & interface that facilitates interaction with the data archive, one corresponding to data archiving and indexing that enables incoming data processing and archiving with indices, and one corresponding to data retrieval that handles query processing and retrieves similar data from the archive. The archive and interface portion comprises the inventor database 150 which may includes one or more databases located in one or more locations, an indexing system 220 that stores indices and index hierarchies associated with the data stored in the inventory database 150, and an inventory manager 219 configured to be able to interface with outside world for any inquiry associated with the data archived and indexed in 150 and 220, respectively.

The data archiving and indexing part includes an input content receiver 202 that receives, via the network 120, data from different sources. The input content receiver 202 may be configured to be able to handle data in different formats and conversion among different formats. In addition, the input content receiver 202 may also be configured to be able to handle different communication protocols to effectuate the data transport so that the received data can be further processed and, ultimately, archived in a meaningful manner. Such received data are then forwarded to an input processor 205, which may include a variety of functions that can be invoked to process the input data. Such processing may include computing various measures based on the input data, dividing the input data into sub-data groups so that each sub-group can be processed effectively. For example, if the input data is an image, the input image can be divided into different sub-images and for each sub-image, measures can be computed for indexing purposes. Other processing may also be applied to the input data. For example, a piece of textual content can be divided into different sections which may be semantically distinct and then each section of the text may be analyzed separately and measures that characterize the semantics of each section may be derived separately. Then the measures for all sections of the textual content may be integrated to form a feature vector that may be used as a characterization of the entire piece of content. Based on such a feature vector, different measures such as LSH may be further computed for indexing purposes.

The results from processed input data and/or the input data may then be forwarded to an indexing unit 207, that may be configured to build an index for each piece of input data. The index or indices for the received input data may be established from a feature vector estimated from the input data. Such derived index value(s) may then be forwarded to an archiving unit 209, which may then interface with the inventory manager 219 to not only have the input data archived but also set up the derived index in the index system 220. In this manner, the input data archived in the inventory database 150 may be effectively retrieved based on its index.

The data retrieval part includes a query receiver 212, a query processor 215, an index value estimator 217, and a query hit selector 210. The query receiver 212 is configured to interface with the outside world to receive a query for which the inventory query engine is to return a result for the query. Similar to the input content receiver 202, the query receiver 212 may be configured to be able to interface with different system in order to handle query communicated in different protocols and with different formats. The received query is forwarded to the query processor 215 where the query is processed in order to determine what is to be retrieved. For instance, a query may request specific information related to biometrics and in this case, the query itself may contain information indicating what is being sought. In another example, the query may look for an article similar to a given article (e.g., attached to the query). In this case, the attached article is part of the query and it needs to be processed to identify what is sought by the user who issues the query.

The result of a processed query may correspond to a feature vector that characterizes the underlying query indicating the characterization of the data to be sought. Such a feature vector can then be used, by the index value estimator 217, to build an index value that can then be used to search for archived data that has similar index value and, hence, constitutes data similar to what is sought by the underlying query. The index value estimator 217 computing an index based on the query and then use that index to interact with the inventory manager 219 to identify any archived data that are similar to what the query is seeking. Details related to the index value estimator 217 is discussed below with reference to FIGS. 3-7(b).

When the index estimated from the query is sent to the inventory manager 219, the inventory manager 219 searches, via the indexing system 220, similar data from the inventory database 150 based on the given index for the query. In general, such search may yield more than one hit (often many) and such identified hit(s) provides a set of candidates for responding to the query. This set of candidates, once forwarded to the query hit selector 210, is then further processed so that the most appropriate data considered to be similar to what the query is asking for can be selected and used to generate a response to the query. Finally, such generated response is returned to the source of the query.

Figure 2A:
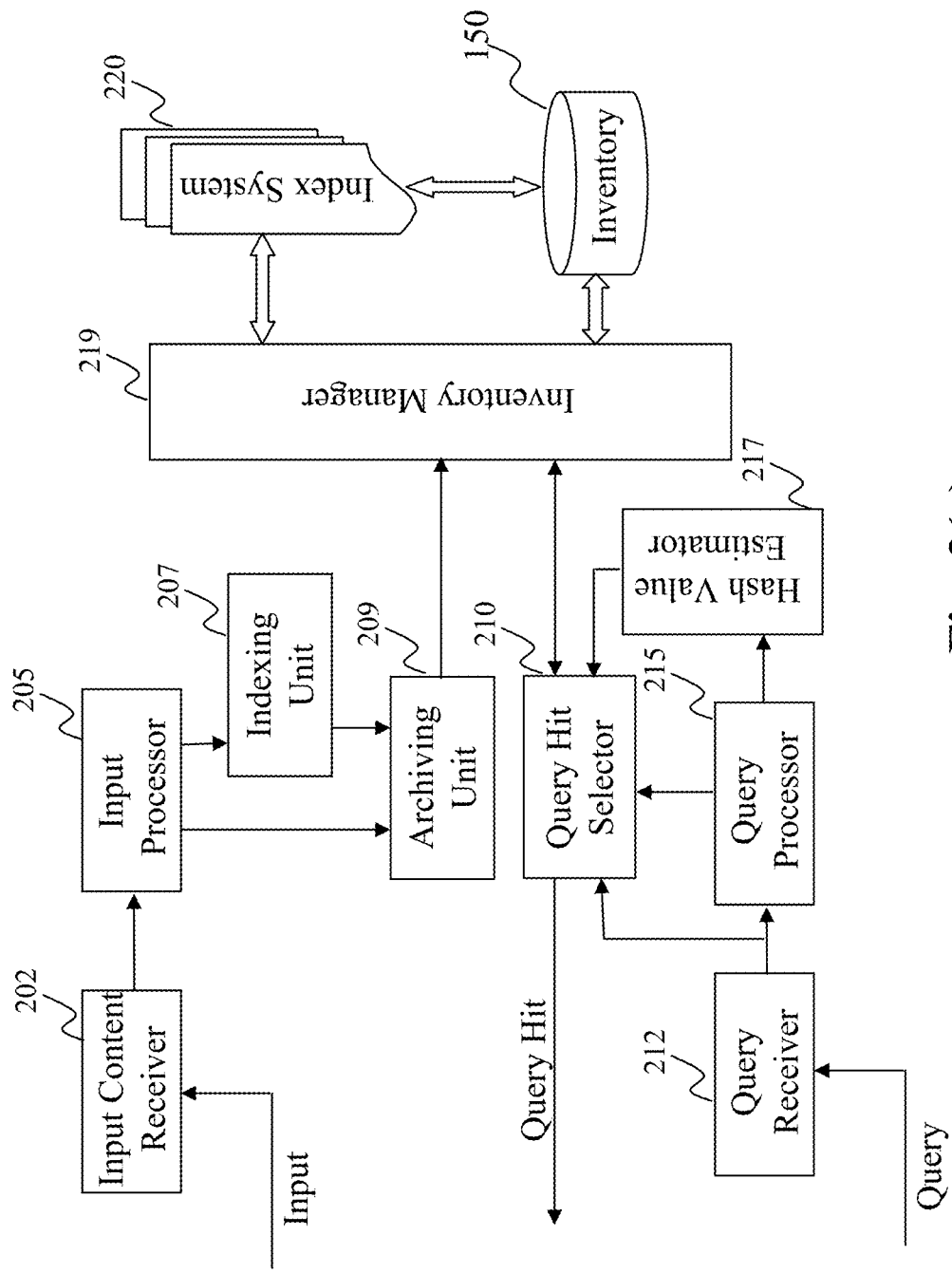
FIG. 2(a) is a high level depiction of an exemplary inventory query engine, according to an embodiment of the present teaching.
Figure 2B:
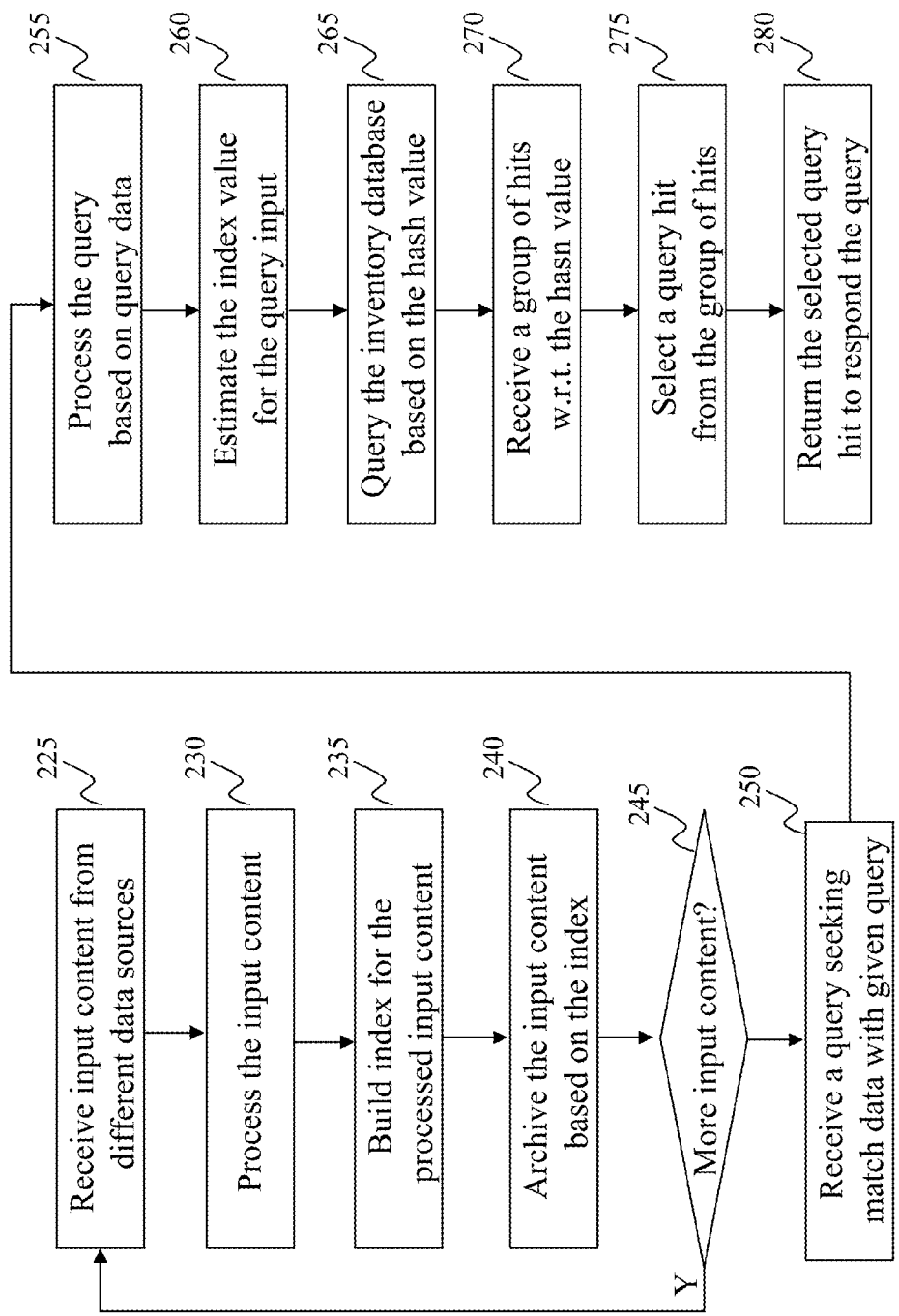
FIG. 2(b) is a flowchart of an exemplary process in which an inventory query engine operates for information search and/or retrieval, according to an embodiment of the present teaching.

FIG. 2(b) is a flowchart of an exemplary process in which the inventory query engine 140 operates for information search and/or retrieval, according to an embodiment of the present teaching. First, input data, received at 225 from different sources, are processed, at 230, for archiving and indexing purposes. For instance, as discussed, various features may be extracted from the received input data and such features form a feature vector characterizing the input data. Based on the extracted feature vector, an index for the input data is established at 235 and is used to archive, at 240, the input data in the inventory database 150. The processing continues whenever there is input data received, determined at 245. In this way, the inventory query engine 140 builds up the inventory database 150 and the index system 220, which are the backbone of the inventory query engine 140.

When the inventory engine 140 receives, at 250, a query or an inquiry for retrieving desired data from the inventory database 150 based on, e.g., some search criteria or content based on which similarity can be assessed, the inventory query engine 140 first processes, at 255, the query/inquiry or any associated criteria or content (query data) and then, based on the processed result, estimate the index of the query data to be used to find similar data from the inventory database 150. Such estimated index is then sent to the inventory manager 219 and to be used to find data that have similar indices. For example, when a particular estimated index value for the query data is estimated, the inventory manager 219 can map this index value via the index system 220 to a particular bucket in the index system 220. As the index system 220 records other indices falling in the same bucket and their associated archived data, such archived data can be treated as candidate pool from which the desired data to respond to the query can be further identified. When the query hit selector 210 receives, at 270 from the inventory manager 219, such identified candidate pool of archived data, it selects specific candidate as the query hit from the pool at 275. The selected query hit is then used to generate a response to the query and returned, at 280, to the user who issues the query.

Figure 3:
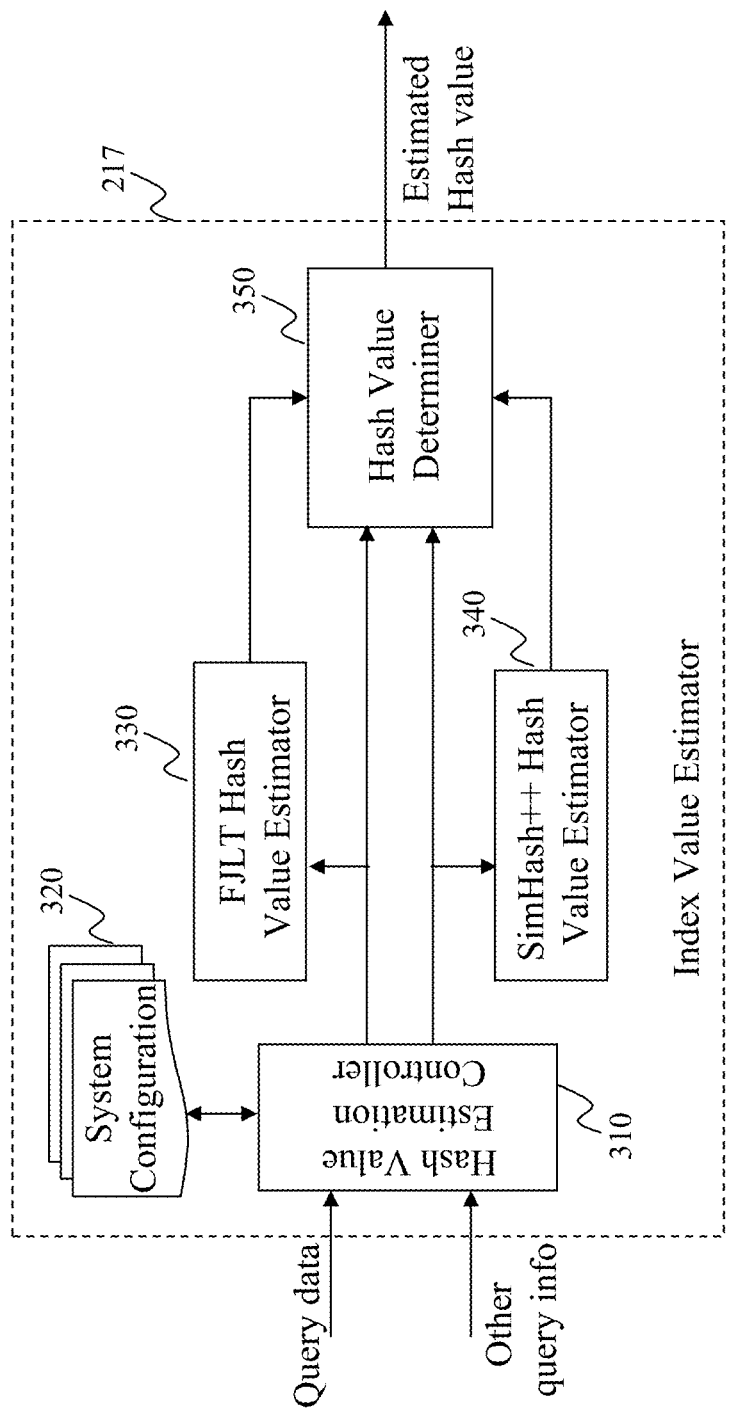
FIG. 3 is a high level depiction of an exemplary hash value estimator, according to an embodiment of the present teaching.

FIG. 3 is a high level depiction of an exemplary index value estimator 217, according to an embodiment of the present teaching. In this illustrated embodiment, the index value to be estimated corresponds to hash value and specifically, the hash values estimated based on improved SimHash (or termed as SimHash++) and improved fast Johnson-Lindenstrass transformation (FJLT) hash value, in accordance with the present teaching. The SimHash++ and the improved FJLT computations represent much faster solution as compared with the conventional approaches and thus enable improved data archiving and retrieval. Such computed hash value enables mapping to hash buckets so that candidate pool for responding to a query is made faster.

The exemplary index value estimator 217 comprises a hash value estimation controller 310, a FJLT hash value estimator 330, a SimHash++ value estimator 340, and a hash value determiner 350. The hash value estimation controller 310 may control which of the hash value is to be computed. For example, depending on application needs or the overall system design of the inventory query engine 140, the hash value estimation controller may dynamically control, e.g., based on the system configuration 320, to compute one of the plurality of hash values. In some embodiments, both FJLT and SimHash++ hash values may be computed for each query and then are combined to yield a more robust result. The index value estimator 217 as described herein may also be employed in the indexing unit 207 (FIG. 2(a)) for computing the index values of the input data for indexing the input data during the archiving operation. The system may record for each piece of archived input data as to how the index is computed so that a similar index may be computed at the stage of data retrieval. In some embodiments, the same piece of input data may be indexed using different indexing approaches (e.g., indexed twice based on improved FJLT and SimHash++, respectively) so that when a query is processed, an index computed in accordance with either scheme will allow fast access to the archived data.

Optionally, the index value estimator 217 also includes various system configurations 320, which may provide various configurable computation parameters to be used in computing the index values. For example, the system configurations 320 may configure the system as to which index values to be used for data archiving so that when data is to be retrieved, the same index value is to be computed in order to identify targets. In addition, the system configurations 320 may also provide various specific parameters to be used to compute each type of index values (will be explained below). Such parameters may be set empirically based on experimentation or knowledge about certain types of data. The system configuration 320 may also be dynamically changed based on needs.

The hash value estimation controller 310 accesses such system configurations and then accordingly controls the operation of computing the index values. For instance, the hash value estimation controller 310 may control the hash value determiner 350 that only SimHash++ index values is to be used to generate a final index value. In addition, the hash value estimation controller 310 may control which functional block (either the FJLT hash value estimator 330 or SimHash++ value estimator 340) to invoke in order to control which index value is to be computed. The hash value estimation controller 310 may also supply appropriate computation parameters, retrieved from the system configuration 320, to either FJLT hash value estimator 330 and SimHash++ value estimator 340 so that each can operate in a controlled manner.

The present teaching discloses improved method to compute similarity so that the data archiving time and query time are improved over the conventional approaches. As an illustrative example of these improvements according to the present teaching, the query time to approximate the angle between two d-dimensional vectors decreases from $O(d/\epsilon^2)$ to $O(d \log 1/\epsilon + 1/\epsilon^2)$. This provides an improvement of 20% or more as compared with the conventional SimHash query time with an increase in space that is smaller than previous improvement. As discussed above, the present teaching provides improvement to both conventional FJLT and SimHash. The improved FJLT operates by, e.g., computing the sign of the following sequence of operations applied to the input vector: randomly flipping the signs of each coordinate of the vector, applying a Hadamard transform, and computing the inner product with a sparse vector. The SimHash++ (an improvement to traditional SimHash), works by, e.g., computing the sign of the following sequence applied to the input vector: randomly flipping the signs of each coordinate of the vector, applying the Hadamard transform, multiplying each coordinate by independent unit Gaussians, and applying another Hadamard transform. The use of a Gaussian operator sandwiched by two Hadamard transforms provides the basis for the improvement as will be explained below.

Both improvements described above exploit the computational advantages of FFT. In some embodiments, the space requirements of FJLT lie between SimHash and SimHash++ whereas, the latter may have a further improved query time than the former. Below, details of the improved FJLT and SimHash++ is provided. First, some notations associated with the disclosure of the improved FJLT and SimHash are defined as follows.

(1) X denotes a set of feature vectors that are input to the hash value estimation operation, where $|X|=n$, and $x \in X$; $x \in R^d$ (2) y denotes a query vector and $y \in R^d$ (3) Both $\|x\|_2 = \|y\|_2 = 1$ (4) $\theta$ is the angle between x and y. $H \in R^{d \times d}$ is Hadamard matrix of order d.

(5) $D_{Hi}$ is a diagonal matrix in $R^{d \times d}$ such that $(D_{Hi})_{jj} = H_{ij}$.

(6) g is a random vector drawn from $N(0, 1_d)$ in $R^d$ (7) D is a diagonal matrix where each entry is $\pm 1$ with equal probability independently.

Different varieties of the improved FJLT and SimHash++ are discussed herein. As to the improved FJLT, a pre-conditioning step is involved that uses a random diagonal matrix, a Hadamard transform, and a multiplication with a sparse Gaussian matrix. In addition, locally sensitive hashing (LSH) based on the improved FJLT is also disclosed that is described, e.g., with the (k,L) parameterized LSH algorithm that uses L2-FJLT to find L different hash-buckets. In such described improved approach, the preconditioning step needs to be computed only once so that it further saves time. Thus, the time needed to compute all the LSH buckets for one query point is $O(d \log d + kL \log^2(d))$, where k is a paramter of the LSH algorithm, as described herein (see disclosure on Method 1 for L2-FJLT onwards). Different methods related to improved FJLT are described below in methods 1-3.

The SimHash++ approach, including exemplary so-called L2-SimHash++ and Cosine-SimHash++, for computing the L2 and cosine similarity based hash buckets are also described below in method 4 and 5. The three different steps in computing the random projection are pre-conditioning of the input vector, applying a random permutation matrix, followed by multiplication by a random diagonal Gaussian matrix and another Hadamard transform. The construction of the (k,L) LSH is shown in method 6. L2-SimHash++ is only used once, and kL indices are sampled with replacement from the resulting vector. Although this may introduce dependence among the L hash-buckets, this dependence does not adversely affect the LSH performance. The time required by SimHash++ based LSH to compute the buckets for a given query point is thus $O(Ld \log d + kL)$. It is possible to get a set of L i.i.d. constructed buckets with a theoretical runtime of $O(Ld \log k)$ by repeatedly invoking a $O(d \log k)$ subroutine for computing k-elements out of the randomized Hadamard transform. Those 6 methods of improved computation of similarity are described respectively below.

Method 1: L2-FJLT

1: Let $H \in R^{d \times d}$ be a Hadamard matrix and D be a diagonal matrix such that $D_{ii}$ is a Bernoulli random variable, where H is a matrix and x is an input feature vector.

2: Let $$q = \min\left(\Theta\left(\frac{\log^2(d/\delta)}{d}\right), 1\right).$$

$M \in R^{k \times d}$ be a matrix where $M_{ij}=0$ with probably 1−q a random variable drawn with $N(0,1/q)$ with a probability q.

3: Let B be a k dimensional random vector with each coordinate drawn from the uniform distribution over $[0,\omega]$.

4: Store $$FJLT(x) = \left\lfloor \frac{MHDx + b}{\omega} \right\rfloor$$

as the hash of an input feature vector x.

Method 2: Cosine-FJLT

1: Let $H \in R^{d \times d}$ be a Hadamard matrix and D be a diagonal matrix such that $D_{ii}$ is a Bernoulli random variable, where H is a matrix and x is an input feature vector.

2: Let $$q = \min\left(\Theta\left(\frac{\log^2(d/\delta)}{d}\right), 1\right).$$

$M \in R^{k \times d}$ be a matrix where $M_{ij}=0$ with probably 1−q a random variable drawn with $N(0,1/q)$ with to probability q.

3: Store FJLT(x)=sgn(MHDx) as the hash of an input feature vector x. Please change Hx to H.

Method 3: FJLT-LSH (k, L)

1: Let $H \in R^{d \times d}$ be a Hadamard matrix and D be a diagonal matrix such that $D_{ii}$ is a Bernoulli random variable, where H is a matrix and x is an input feature vector.

2: Compute, y=HDx be the densification of x. Similarly, D is a matrix and x is the input feature vector.

3: for i=1, . . . , L do

4: Let $$q = \min\left(\Theta\left(\frac{\log^2(d/\delta)}{d}\right), 1\right).$$

$M \in R^{k \times d}$ be a matrix where $M_{ij}=0$ with probably 1−q a random variable drawn with $N(0,1/q)$ with a probability q.

5: Let B be a k dimensional random vector with each coordinate drawn from the uniform distribution over $[0,\omega]$.

6: Store $$FJLT_i = \left\lfloor \frac{My + B}{\omega} \right\rfloor$$

as the $i^{th}$ hash of an input feature vector x.

Figure 4A:
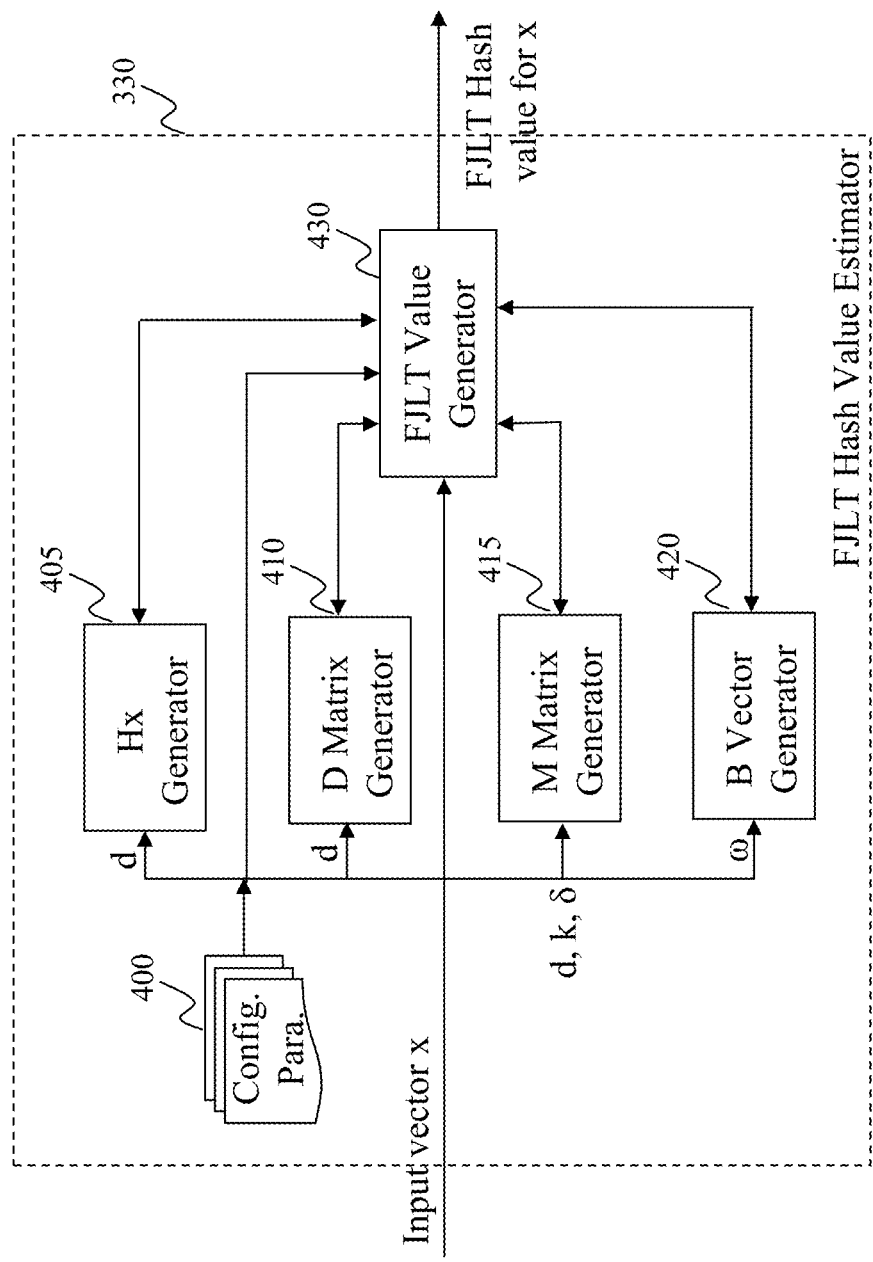
FIGS. 4(a)-4(b) show exemplary system diagrams of an FJLT hash value estimator, according to an embodiment of the present teaching.
Figure 4B:
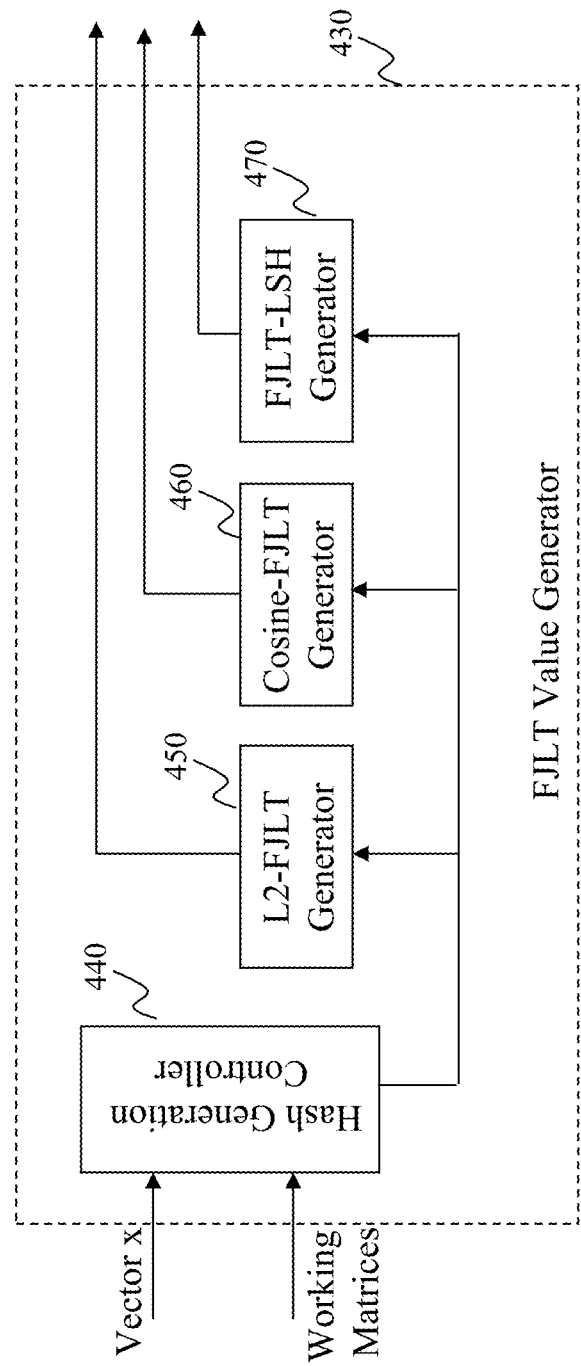

These FJLT related methods may be realized by the FJLT hash value estimator 330. The FIG. 4(*a*) depicts an exemplary system diagram of the FJLT hash value estimator 330 in accordance with the exemplary methods of computing an improved FJLT hash value, as discussed above. In this illustrated embodiment, the FJLT has value estimator 330 includes a FJLT value generator 430 that computes an FJLT index value based on an input feature vector x. The FJLT hash value generator may be configure to compute an FJLT hash value in accordance with any of the above three exemplary methods. This is illustrated in FIG. 4(*b*), where a hash generation controller 440 in the FJLT value generator 430 is connected to an L2-FJLT generator 450, a cosine-FJLT generator 460, and an FJLT-LSH generator 470 and can invoke any one of them to compute an FJLT based hash value.

In operation, the FJLT value generator 430 may invoke different functional modules to obtain different intermediary information to be used to compute the FJLT hash value, depending on, e.g., which method (of the above discussed three) of FJLT-based hash generation is to be used to compute the hash value. For example, the FJLT hash value estimator 330 includes an Hx generator 405 that may transform an input feature vector x using Hadamard transformation. This functional module may be realized using different implementations. In some embodiments, the Hadamard transformation may be implemented in hardware so that it takes an input feature vector x as input and after the input feature vector runs through the hardware, the outcome is the transformation Hx. In some embodiments, Hx can also be implemented as a special procedure in software, hardware, or firmware to enable faster computation. The Hx generator 405 may also be implemented based on some parameters such as dimensionality d as its input.

The FJLT hash value estimator 330 may also include a D matrix generator that may produce a D matrix as define above with each entry $D_{ij}$ to be a Bernouli random variable. Such a matrix, once generated, may be provided to the FJLT value generator to compute an FJLT hash value. Similarly, the FJLT hash value estimator 330 may also include an M matrix generator 415 and a B vector generator 420 that generate the M matrix and B vector in accordance with the formulae as disclosed above and provide such matrix and vector to the FJLT value generator 430 in order to generate FJLT hash value. All such functional modules operate based on various operational parameters, which may be retrieved from the system configuration 320, as discussed above. In some embodiments, the operational parameters that are used in computing various intermediary matrices or vectors may be stored directly in the FJLT hash value estimator as shown in FIG. 4(*a*), where the configuration parameter storage is provided to store such operational parameters. For instance, dimensional parameter d is provided to multiple functional modules (405, 410, and 415), parameters k and δ is provided to the M matrix generator 415, and parameter ω is provided to the B vector generator 420 to facilitate their corresponding computations.

Figure 5A:
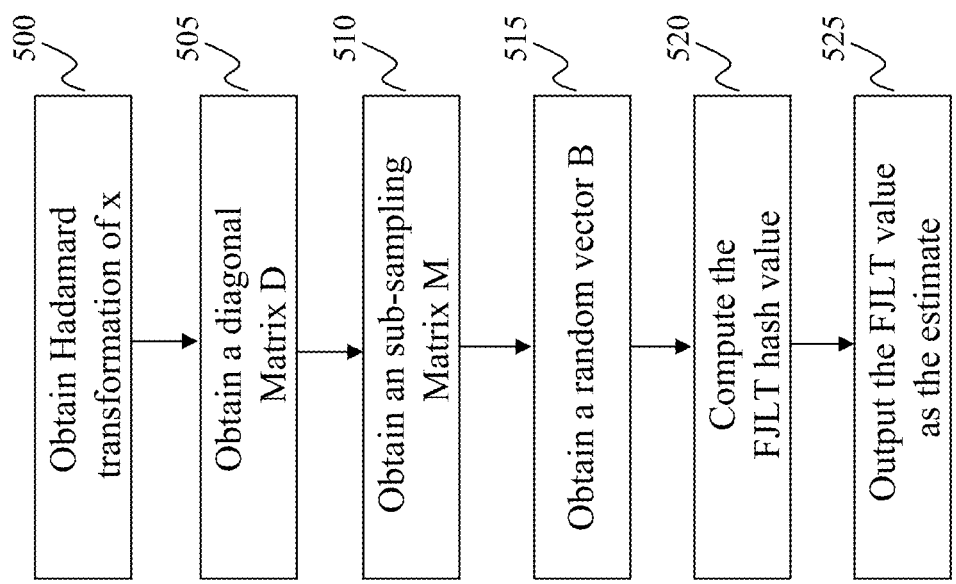
FIGS. 5(a)-5(b) show flowcharts of exemplary processes in which an FJLT hash value estimator computes an FJLT hash value, according to an embodiment of the present teaching.
Figure 5B:
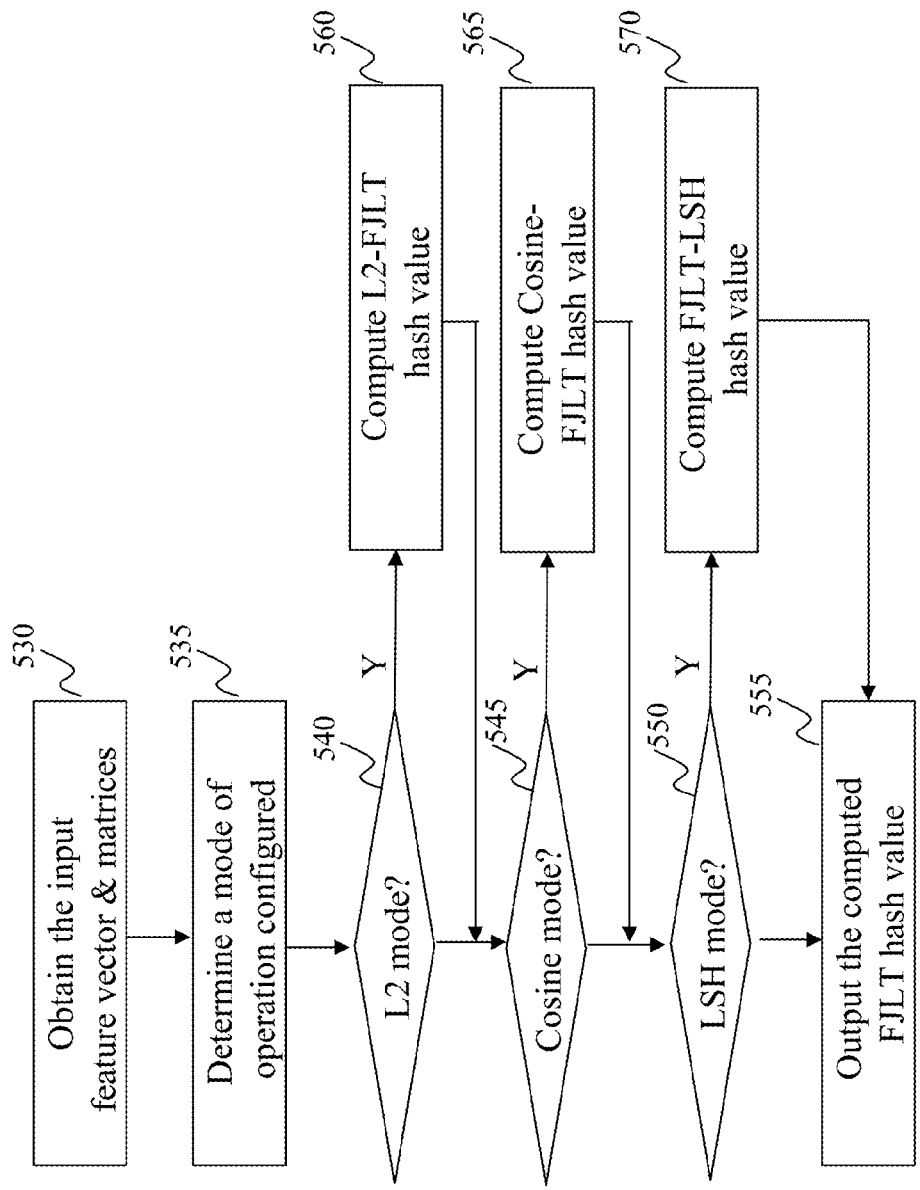

FIG. 5(*a*) is a flowchart of an exemplary process for the FJLT hash value estimator 330. Upon receiving an input feature vector, the Hadamard transformation of the input feature vector x is first generated at 500 and a diagonal matrix D is also obtain at 505. To sub-sampling the input feature vector of dimension d, a sub-sampling matrix M is obtain at 510 based on a number of parameters (q, d, k, and δ) and the B vector is also obtained at 515. With such matrices and vector, the FJLT hash value can be computed, at 520, based on any of the methods 1-3 described above. Detailed operational steps of this computation is provided below with reference to FIG. 5(*b*). Then such computed FJLT hash value is output from the FJLT hash value estimator 330 as the estimated index value.

FIG. 5(*b*) is a flowchart of an exemplary process for the FJLT value generator 430 where the actual hash value is computed. First, the input feature vector x and various intermediary matrices and vectors are obtained at 530. A mode of operation configured to compute the hash values is then determined at 535. If it is determined that L2-FJLT hash value is to be estimated, determined at 540, the L2-FJLT hash value is computed as $$FJLT(x) = \left\lfloor \frac{MHDx + V}{\omega} \right\rfloor.$$

Once the L2-FJLT hash value is computed or when it is decided that no L2-FJLT hash value is to be computed, the processing goes to determine if cosine-FJLT hash value is to be computed at 545. In some embodiments, it is possible to compute multiple types of FJLT hash values and then may be integrated in certain manner to, e.g., improve the reliability of the search. If a cosine-FJLT hash value is to be computed, the FJLT value estimator 430 computes the hash value to be the sign of (MHDx). After the cosine-FJLT hash value is computed or when it is determined that no cosine-FJLT hash value is to be computed, it is further determined, at 550, whether LSH based FJLT hash values are to be computed. If so, the FJLT value generator 430 computes the LSH based FJLT hash values in accordance with the loop discussed above in method 3. Such computed FJLT hash value(s) is then output, at 555, as the estimated FJLT hash value(s).

Below, different exemplary hash values computed based on SimHash++ approach are described. Specifically, three exemplary methods are disclosed: L2-SimHash++ method, cosine-SimHash++ method, and LSH-SimHash++ method.

Method 4: L2-SimHash++
1: Obtain input parameters (k,ω).
2: Let $H \in R^{d \times d}$ be a Hadamard matrix and D be a diagonal matrix such that $D_{ii}$ is a Bernoulli random variable.
3: Let $G \in R^{d \times d}$ be a diagonal matrix such that $G_{ii}$ is an i.i.d. random variable drawn from N (0,1).
4: Let P be a random permutation matrix.
5: Let V be a vector of i.i.d. random variables drawn from the uniform distribution over [0,ω].
6: Define $$z = \left\lfloor \frac{HGPHDx + V}{\omega} \right\rfloor.$$

as the hash value of the input feature vector x.

Method 5: Cosine-SimHash++
1: Obtain input parameters k.
2: Let $H \in R^{d \times d}$ be a Hadamard matrix and D be a diagonal matrix such that $D_{ii}$ is a diagonal matrix such that $D_{ii}$ is a Bernoulli random variable.
3: Let $G \in R^{d \times d}$ be a diagonal matrix such that $G_{ii}$ is an i.i.d. random variable drawn from N (0,1).
4: Let P be a random permutation matrix.
5: Define z=sgn(HGPHDx)
6: Sample k entries from z and define the hash of input feature vector x to be the concatenation of these k entries.

Method 6: SIMHASH++ based LSH(k, L)
1: z=L2-SIMHASH++ (x).
2: for i=1, L do

3: Sample k entries from z and store as the i$^{th}$ hash of input feature vector x.

Figure 6A:
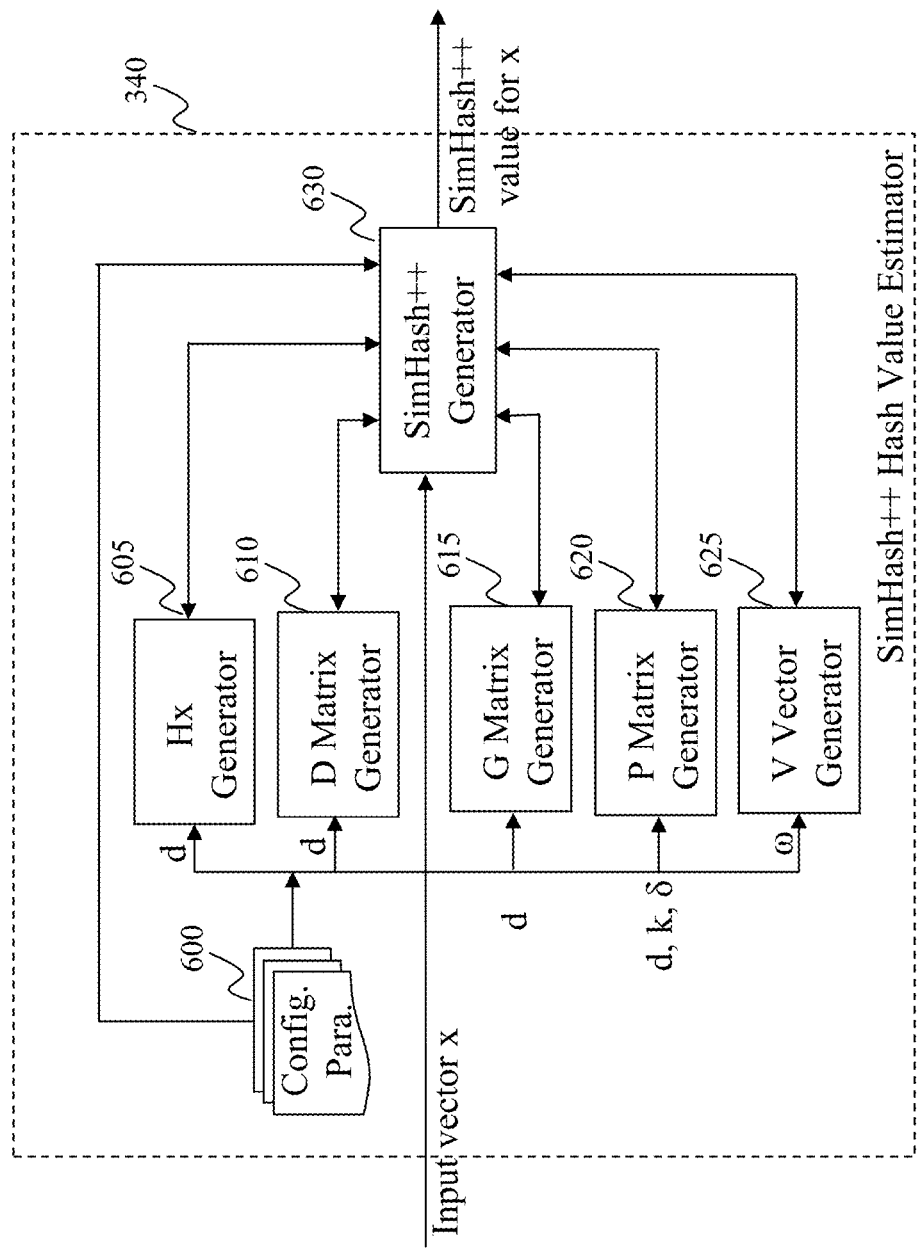
FIGS. 6(a)-6(b) show exemplary system diagrams of a SimHash++ has value estimator, according to an embodiment of the present teaching.

These SimHash++ related methods may be realized by the SimHash++ hash value estimator 340. Specifically, FIG. 6(a) depicts an exemplary system diagram of the SimHash++ hash value estimator 340. Similar to the system diagram for FJLT hash value estimator 330, the SimHash++ hash value estimator 340 includes a SimHash++ generator 630 that interacts with multiple functional modules 605, 610, 615, 620, and 625 to obtain various matrices and vectors to be used to compute the SimHash++ hash value. This includes the H generator 605 that generates a Hadamard transformation of the input feature vector, a D matrix generator 610 that creates a Bernoulli matrix, for the computation, a G matrix generator 615 that produces a Gaussian diagonal matrix for the computation, a P matrix generator 620 that creates a random permutation matrix for computing a SimHash++ value for the input feature vector, and a V vector generator 625 that creates a vector of i.i.d. random variables.

Functional modules 605-625 may obtain operational parameters from a configuration parameter storage 600 such as the dimension of the input feature vector d and the sub-sampling dimension k. Alternatively, in some embodiments, such parameters may also be stored in the system configuration 320, as discussed above. Also similar to the FJLT value generator 430, the SimHash++ generator 630 may include a hash generation controller 640 that controls the invocation of one or more functional blocks 650, 660, and 670, each of which is responsible for computing the SimHash++ value in accordance with one of the SimHash++ methods described above. Specifically, the L2-SimHash++ generator 650 is for computing a L2 based SimHash++ value for the input feature vector. The cosine SimHash++ generator 660 is to compute a cosine based SimHash++ value and the SimHash++-LSH generator 670 is for generating a series of locality sensitive SimHash++ values. One or more SimHash++ values may be obtained. When multiple SimHash++ values are obtained, they may be integrated in order to improve the robustness of the hash value.

Figure 7A:
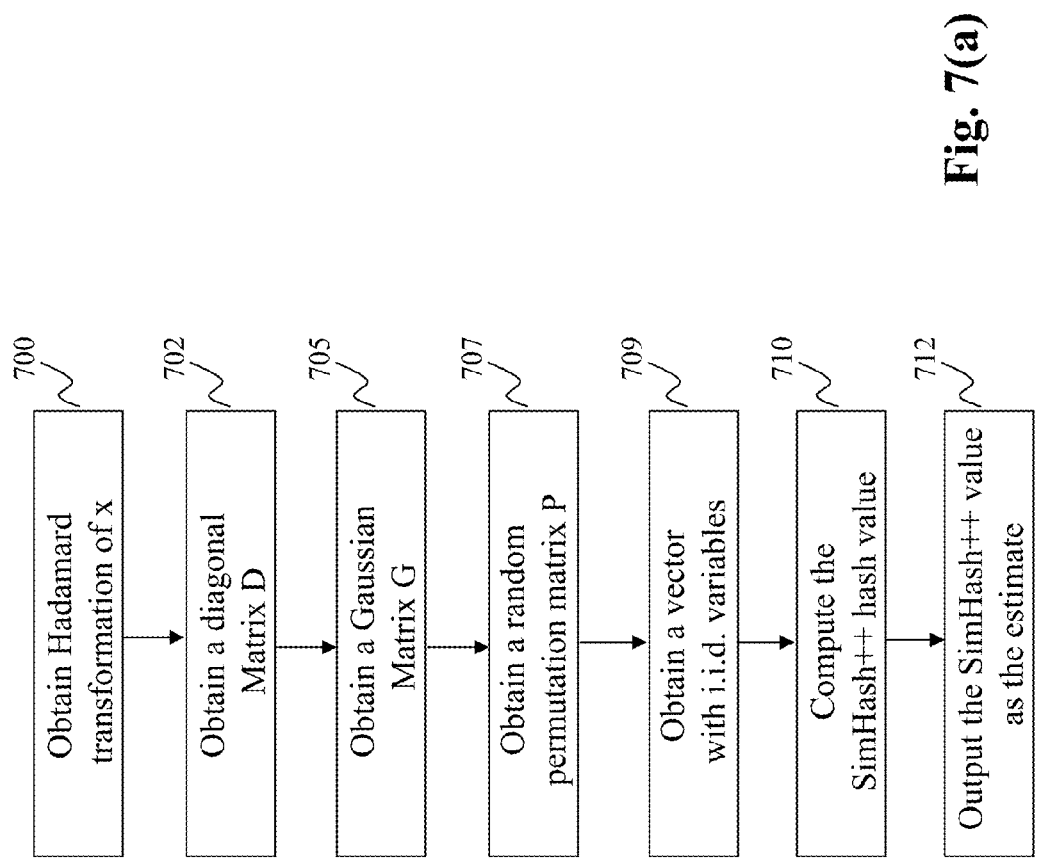
FIGS. 7(a)-7(b) show flowcharts of exemplary processes in which a SimHash++ hash value estimator computes a SimHash++πhash value, according to an embodiment of the present teaching.

FIG. 7(a) is a flowchart of an exemplary process in which the SimHash++ hash value estimator 340 generates a SimHash++ hash value. Upon receiving an input feature vector, the SimHash++ has value estimator 340 obtains various intermediary matrices and vectors that are to be used in computing one or more SimHash++ hash values at steps 702-709. Once all such computational components are created, the SimHash++ hash value 1 estimated at 710. Details related to the computation is discussed next. Once the SimHash++ value(s) is estimated, the index value is output at 712.

Figure 6B:
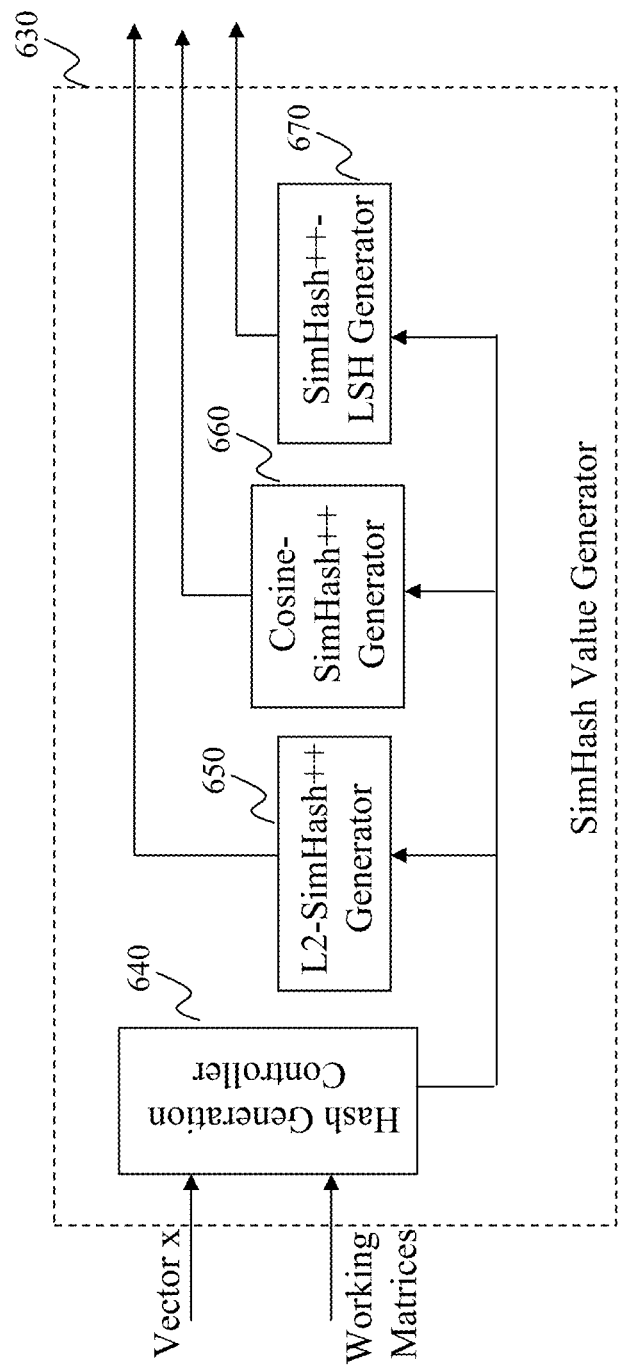
Figure 7B:
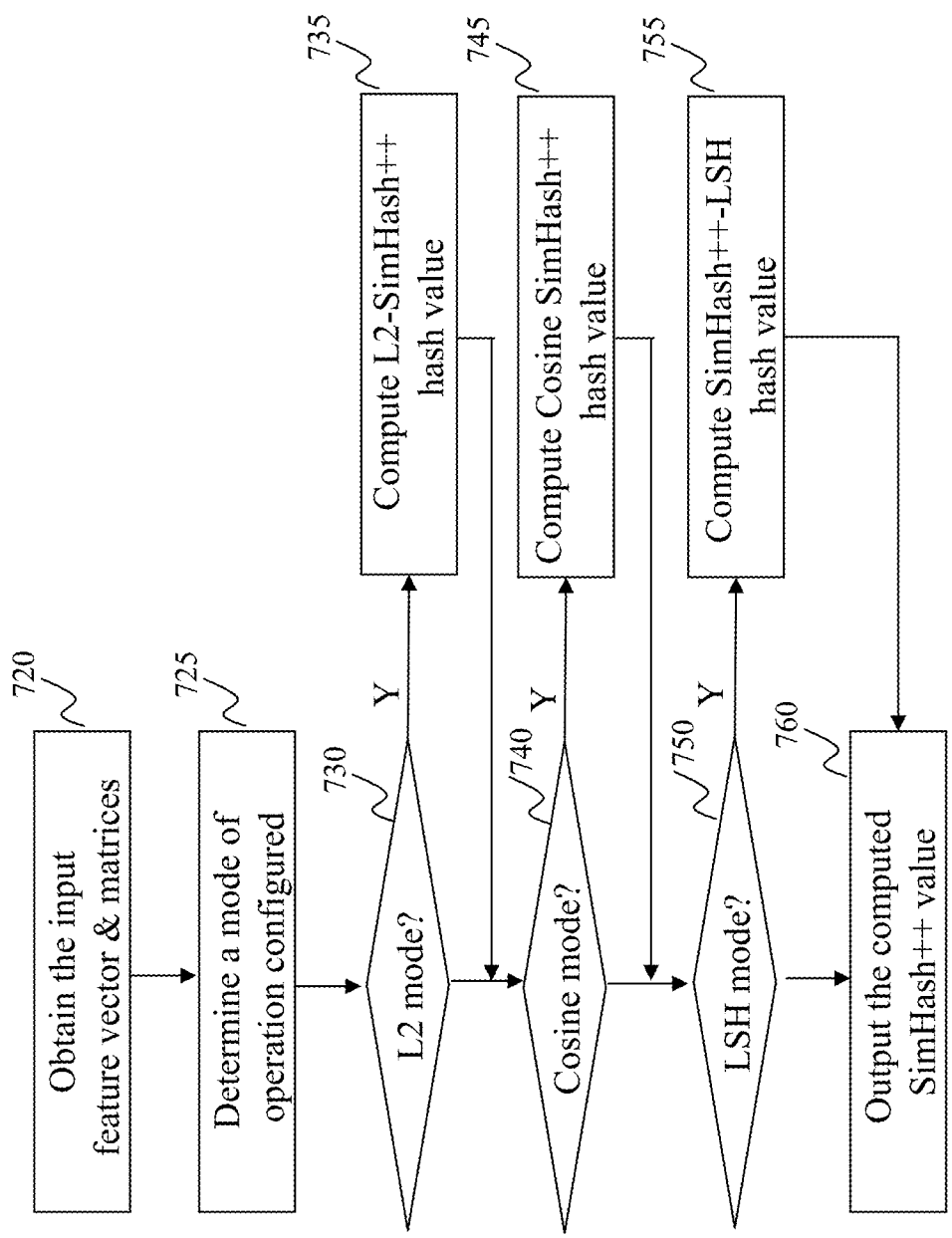

FIG. 7(b) is a flowchart of an exemplary process of computing one or more SimHash++ hash values. Input feature vector, operational parameters, and other computational components are first obtained first at 720. The mode of operation is then determined. Such mode of operation relates to the type of SimHash++ values to be estimated. The configuration of the mode of operation may be stored in the system configuration 320. If it is configured to compute L2-SimHash++ index value, determined at 730, the SimHash++ value generator 630 invokes (see FIG. 6(b)) the L2-SimHash++ generator 650 to compute, at 735, the L2-SimHash++ value in accordance with $$z = \left\lfloor \frac{HGPHDx + V}{\omega} \right\rfloor.$$

If it is determined, at 740 (either after the computation of the L2-SimHash++ value or it is determined that no L2-SimHash++ value is to be computed), that a cosine based SimHash++ value is to be estimated, the SimHash++ value generator 630 invokes (see FIG. 6(b)) the cosine-SimHash++ generator 660 to compute, at 745, the cosine-SimHash++ value based on the concatenation of these k entries sampled from z=sgn(HGPHDx). If it is determined, at 750 (either after the computation of the cosine-SimHash++ value or it is determined that no cosine-SimHash++ value is to be computed), that a series of locality sensitive SimHash++ values are to be estimated, the SimHash++ value generator 630 invokes (see FIG. 6(b)) the LSH-SimHash++ generator 670 to compute, at 755, ith LSH-SimHash++ values based on k entries sampled from z=sgn(HGPHDx). Such computed SimHash++ value(s) are then output, at 760, as the estimated index value of the input feature vector x.

Referring back to FIG. 2(a), the details related to the computation of hash value may be used by both the hash value estimator 217 (when it computes the hash value of the query data in order to identify similar data from the inventory database 150) and the indexing unit 207 (when it computes the index for input data in order to archive the input data in the inventory database 150). When the computed hash value based on the query is estimated, the has value is forwarded to the inventory manager 219 that then use the estimated hash value to determine a hash bucket in the index system 220 so that the archived data whose hash values fall in the same bucket can be identified as the candidates for the desired data. Such candidates are returned to the query hit selector 210 which subsequently selects the appropriate data as the queried data.

Figure 8A:
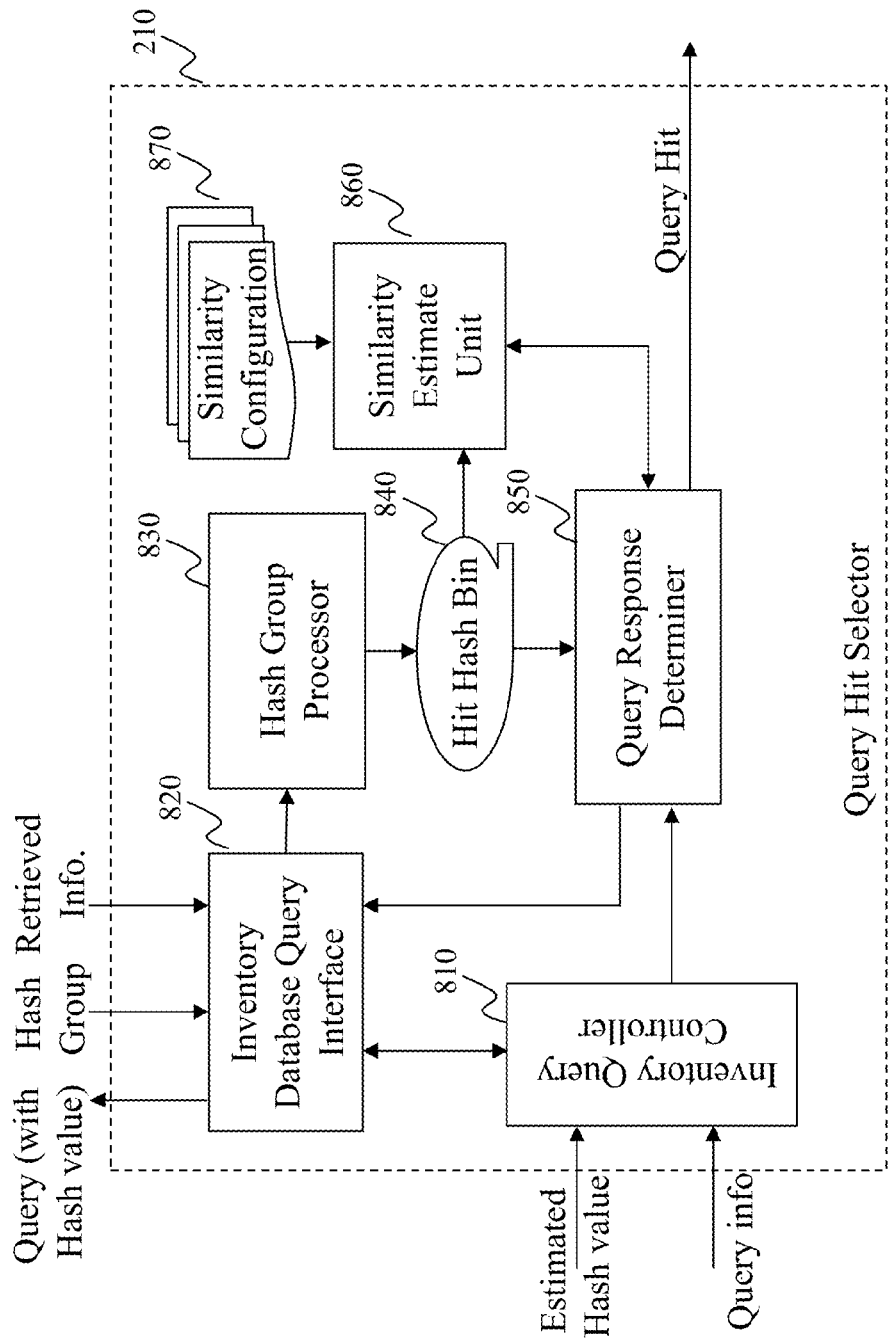
FIG. 8(a) depicts an exemplary system diagram of a query hit selector, according to an embodiment of the present teaching.

FIG. 8(a) depicts an exemplary system diagram of the query hit selector 210. The query hit selector 210 is a module that takes the processing results from the query processor 215 and the estimated hash value for the query from the hash value estimator 217, interfaces with the inventory manager 219 to receive a pool of query response candidates, select the most appropriate candidate as a response to the query, and return the response to the source of the query (see FIG. 2(a)). To achieve those, the query hit selector 210 comprises an inventory query controller 810, an inventory database query interface 820, a hash group processor 830, a similarity estimate unit 860, and a query response determiner 850.

The inventory query controller 810 interfaces with the query receiver 212, the query processor 215, and the hash value estimator 217 to obtain information relevant to facilitate the inventory manager 219 to search for desired data, e.g., the query information and the estimated hash value of the query. Such relevant information is sent to the inventory database query interface 820, that may forward some information to the inventory manager 219 (e.g., the estimated hash value for the query) and receive information from the inventory manager 219 that facilitate the query hit selector to form a query response. Examples of such received information includes candidates from the same hash bucket in the inventory database 150 and/or other relevant information. In some embodiments, archived data having hash values that, although not in the same hash bin or bucket, are close to the estimated query hash value may also be returned from the inventory manager 219.

Upon receiving the candidates from the inventory manager 219, the inventory database query interface 820 forwards such results to the hash group processor 830, which may populate the candidates into one or more hash bins 840. In some embodiments, such candidate information may be just the hash values of the candidates. In some embodiments, the candidate information received may include both the archived data themselves and their hash values. In the former situation, if a response is selected based on the hash value of a particular candidate, in order to form a response, the inventory database query interface may request the inventory manager 219 to return that particular piece of archived data.

Figure 8B:
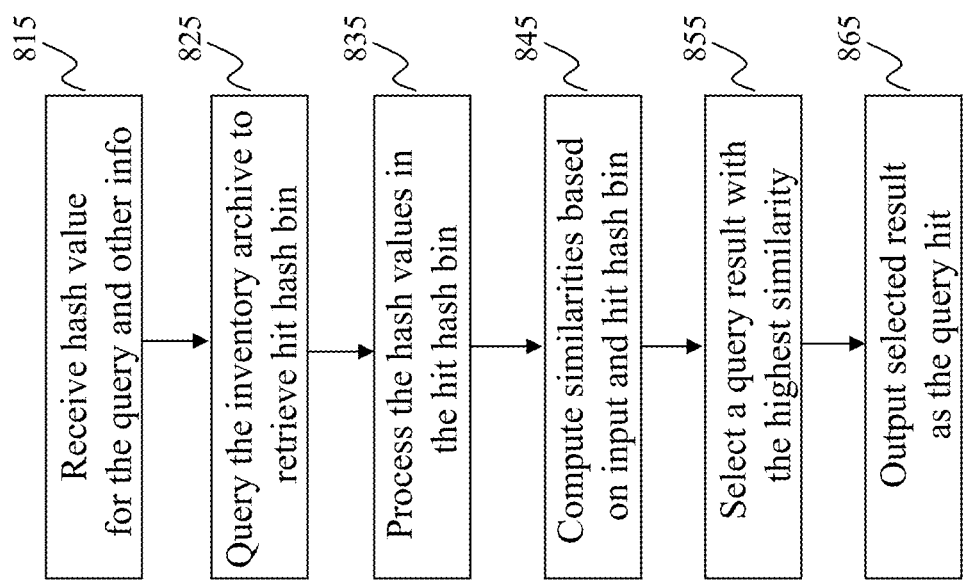
FIG. 8(b) is a flowchart of an exemplary process in which a query hit selector operates to select a query hit, according to an embodiment of the present teaching.

To select an appropriate candidate from a pool of candidates, further analysis may be performed to assess the level of similarity between the query data and the archived data. To do so, the similarity estimate unit may estimate the similarity between the query data and each and every of the candidates so far identified. The computation of the similarity may be controlled by a similarity configuration 870 and the configured similarity to be used to select a response may be dynamically changed, e.g., based on the application needs or change of nature of the underlying data. The similarity measures between the query data and all the candidates may then be forwarded to the query response determiner 850, where for each query, one or more responses may be selected and may be ranked based on the level of similarity. Such selected candidates are then used to form or generate a response and returned to respond to the query. FIG. 8(b) is a flowchart of an exemplary process for the query hit selector 210, which substantially reflects what is disclosed herein as to the function of the query hit selector.

The improved FJLT and the SimHash++ have shown gains in performance in practice. The experimental results illustrated in FIGS. 9(a)-10(g) show that using the disclosed methods as compared against a standard LSH implementation as the baseline lead to performance enhancement. In such experiments, at least two of the datasets used are publicly available for repeatability purposes. The result were obtained in the R-near-neighbor setting. Given an input dataset and a query point, the goal is to return the set of points that lie within distance R of the query point.

Specifically, the experiments were performed on four different datasets: "flickr", "queries", "mnist" and "p53". The flickr dataset includes few million images, each represented as a dense vector of dimension 1024. Out of these images, one million images were sampled in order to create the input dataset, and another 10,000 images are used to create the query set. When creating the query set, it was ensured that the same image (according to the identifier present in the dataset) does not belong to both the input dataset and the query set. The "queries" dataset was created using an analogous dataset to demonstrate how temporal correlation of search-queries is indicative of semantic similarity.

TABLE 1

Description of datasets.

| Name | nPoints | dimension | nQuery |
| --- | --- | --- | --- |
| flickr | 1 million | 1024 | 10 k |
| query | 1 million | 376 | 10 k |
| mnist | 60 k | 784 | 10 k |
| p53 | 14.6 k | 5408 | 2 k |

In creating the queries dataset, frequencies of queries submitted to a major search-engine for 376 consecutive days were tracked. Each query was then represented as a vector of length 376, where the entry is the frequency of query on the query day. During the experiments, only the top queries were retained, and again partitioned and sampled the set to get one-million input vectors and 10,000 query vectors. Each of the input vectors and query vectors were also normalized using the mean and standard deviation.

For the sake of repeatability, the methods disclosed herein were also applied to two publicly available datasets, namely, mnist. and p53. The mnist dataset includes byte representations of images of handwritten digits that have been size normalized and pre-partitioned into training and test sets. No preprocessing was performed on this dataset, and the 60 k training images were used as the input points and 10 k query images were used as query points. The p53 dataset includes feature vectors that are each of size 5409, where each dimension indicates a feature value extracted from a biophysical model of the p53 protein. For this dataset, all the data points that had missing entries were removed which reduced the size of the dataset from 16.7 k to 16.6 k. These points were then partitioned randomly into 2 k query points and 14.6 k input points.

The LSH implementation was based on the $E^2$LSH implementation. $E^2$LSH implements R-near neighbor by first constructing a set of candidates using the LSH hash-buckets that the query point falls into, and then pruning the set of candidate by comparing each of them to the query point. The total query time is thus dependent on both the time taken to compute the LSH buckets and on the number of possible candidates returned by the LSH buckets. The two chief error metrics are (i) the average recall obtained, i.e., what fraction of the R-near neighbors are actually returned, and (ii) the average query time.

Four different algorithms, namely, "SIMHASH++", "naive" LSH, and two variant of FJLT-hash, "FJLT50" and "FJLT25", with the sparsity parameter set to 0.5 and 0.25 respectively were compared. For each dataset, four different radii were chosen, and these were chosen such that the average numbers of R-near neighbors are approximately 10, 25, 50, and 100. In order to be able to compare the query-times of the different LSH for various algorithms, the targeted recall was fixed at 0.9. Next, iterations were performed over a range of parameters k and L and the selected the parameter tuple having the minimum average query-time while having a macro-averaged recall over 0.9. In one embodiment, the recall of all the candidates is fixed at exactly 0.9 to be able to compare the query-times. In another embodiment, $E^2$LSH provides a functionality to estimate the optimal parameter set for a given recall and a given radius This initial estimation was used to guide the construction of the grid of parameters.

FIGS. 9(a)-10(h) correspond to the outputs of four different metrics for each dataset, for each radius: the recall obtained, the average query-time, the time taken to compute the LSH indices and the space used, and the average number of nearest neighbor candidates that the $E^2$LSH algorithm had to sift through. FIGS. 9(b), 9(e), 9(h), and 9(k) show the recalls achieved at the chosen parameter tuples for each of the radius values. As discussed above, the recall values are close to each other, but are aligned imperfectly; however, the recall for SIMHASH++ is almost always more than that of the naive algorithm at the chosen parameter tuple, thus making claims of query-time improvements viable.

FIGS. 9(a), 9(d), 9(g), and 9(j) show the average query-times obtained with the parameters that gave the aforementioned recalls. Overall, about a 15-20% improvement in most cases (and up to 50% maximum) by using SIMHASH++ over naïve is obtained.

FIGS. 10(b), 10(d), 10(f), and 10(h) depict the number of candidates that the LSH index returned as hits and the actual pairwise distance computed for by $E^2$LSH. The results are mostly correlated with FIGS. 9(a), 9(d), 9(g) and 9(j), except for the cases where in spite of having generated more candidates, SIMHASH++ runs faster as an effect of having computed the LSH functions much more efficiently.

FIGS. 9(c), 9(f), 9(i) and 9(l) show the time taken in the computation of the LSH index for the average query point. As expected, SIMHASH++ is always faster than the naive LSH. FJLT, however, is not always faster than naive, which is a result of two effects: at the sparsity setting used, it still needs to compute an almost dense matrix-vector product, and the number of replications L needed for FJLT (and for SIMHASH++) is typically more than that required for naive.

Finally, FIGS. 10(a), 10(c), 10(e), and 10(g) show the space used by the chosen parameter settings, measured by the value of L, the number of replications performed. Clearly, SIMHASH++ has been able to improve runtime only at the expense of using more space than the plain LSH.

It is understood that, although exemplary measurements reflecting the interestingness of an explanation are described herein, they are by ways of example rather than limitation. Any other appropriate and reasonable measurements can be employed to perform heterogeneous data management as disclosed herein and they will be all within the scope of the present teaching.

To implement the present teaching, computer hardware platforms may be used as the hardware platform(s) for one or more of the elements described herein (e.g., the indexing unit 207, the archiving unit 209, the hash value estimator 217, and the query hit selector 210). The hardware elements, operating systems and programming languages of such computers are conventional in nature, and it is presumed that those skilled in the art are adequately familiar therewith to adapt those technologies to implement the DCP processing essentially as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 11:
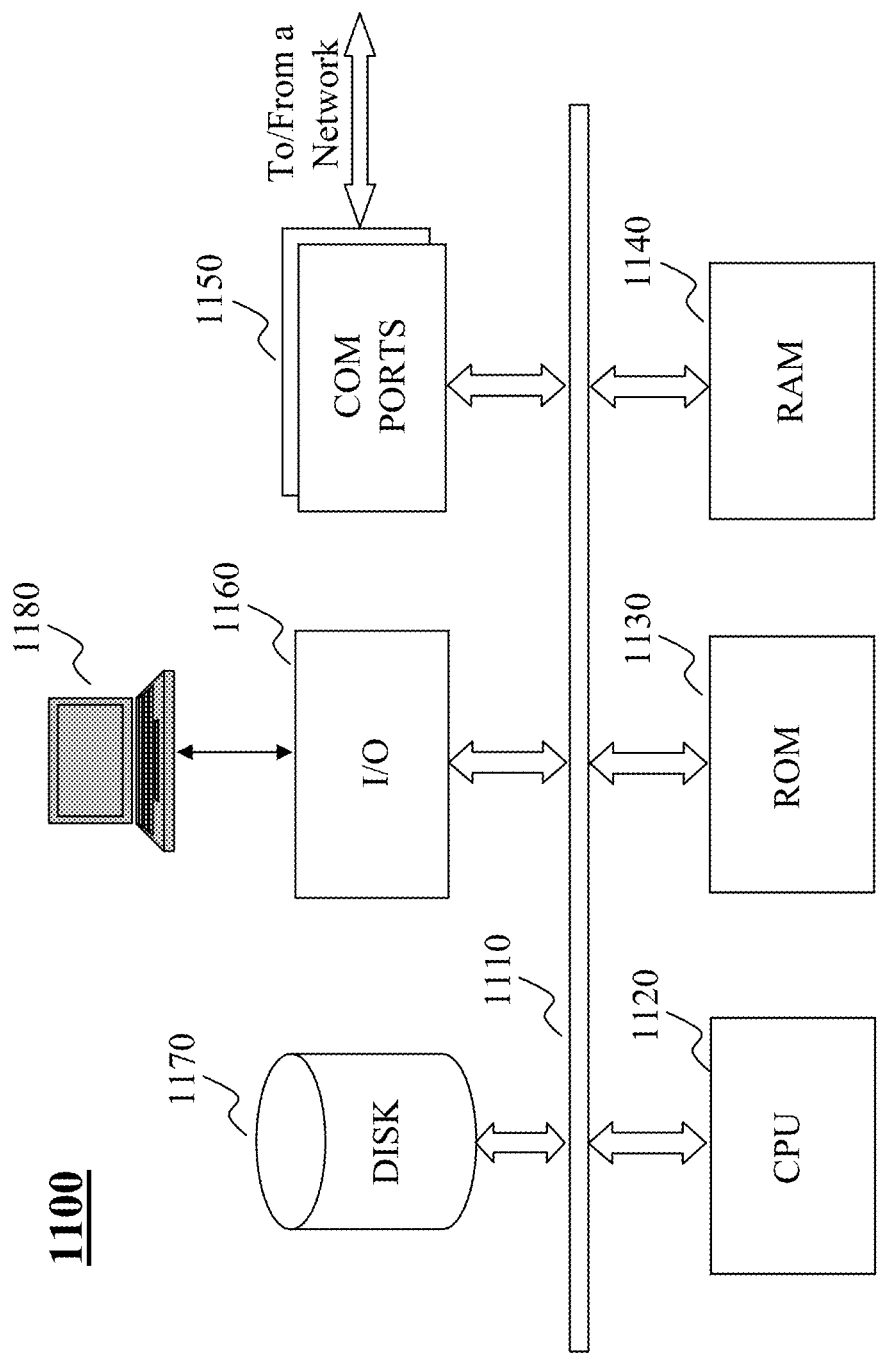
FIG. 11 depicts a general computer architecture on which the present teaching can be implemented.

FIG. 11 depicts a general computer architecture on which the present teaching can be implemented and has a functional block diagram illustration of a computer hardware platform which includes use interface elements. The computer may be a general purpose computer or a special purpose computer. This computer 1100 can be used to implement any components of the heterogeneous data management architecture as described herein. Different components of the inventory query engine 140, e.g., as depicted in FIG. 2(a), can all be implemented on a computer such as computer 1100, via its hardware, software program, firmware, or a combination thereof. Although only one such computer is shown, for convenience, the computer functions relating to dynamic relation and event detection may be implemented in a distributed fashion on a number of similar platforms, to distribute the processing load.

The computer 1100, for example, includes COM ports 1150 connected to and from a network connected thereto to facilitate data communications. The computer 1100 also includes a central processing unit (CPU) 1120, in the form of one or more processors, for executing program instructions. The exemplary computer platform includes an internal communication bus 1110, program storage and data storage of different forms, e.g., disk 1170, read only memory (ROM) 1130, or random access memory (RAM) 1140, for various data files to be processed and/or communicated by the computer, as well as possibly program instructions to be executed by the CPU. The computer 1000 also includes an I/O component 1160, supporting input/output flows between the computer and other components therein such as user interface elements 1080. The computer 1100 may also receive programming and data via network communications.

Hence, aspects of the method of inventory query engine and fast similarity computation, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of the search engine operator or other explanation generation service provider into the hardware platform(s) of a computing environment or other system implementing a computing environment or similar functionalities in connection with generating explanations based on user inquiries. Thus, another type of media that may hear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the dynamic relation/event detector and its components as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform making a connection to a network for information search, comprising the steps of:
   receiving, by an input content receiver via the communication platform, input data from one or more data sources;
   analyzing, by an input processor, the input data to obtain an input feature vector characterizing an input vector x of d dimensions comprising signs of features;
   generating, by an indexing unit, an index of the input data based on the input feature vector;
   archiving, by an archiving unit, the input data in an inventory database based on a value of the index, wherein the value of the index for the input data is computed based on a fast Johnson-Lindenstrass transformation (FJLT) process comprising the steps of:
   randomly flipping the signs of the features in the input feature vector to obtain a flipped vector,
   applying a Hadamard transformation to the flipped vector to obtain a transformed vector, and
   computing an inner product between the transformed vector and a sparse vector to obtained a base vector;
   determining the value of the index based on the base vector; and wherein the value of index corresponds to a hash value based on the steps of:
   obtaining, a multiplication HDx of the input vector x, via a fast Walsh-Hadamard transform (FWHT) Hx obtained based on a Hadamard matrix H as well as a diagonal matrix D comprising elements $D_{ii}$, where both the Hadamard matrix and the diagonal matrix D is d×d dimension and each element $D_{ii}$ in the diagonal matrix D is a Bernoulli random variable;
   obtaining, by an M matrix generator, a k by d sub-sampling matrix M comprising elements $M_{ij}$, where k is smaller than d, such that each element $M_{ij}$ in the sub-sampling matrix M is zero with a probability (1−q) and a random variable drawn with probability q from a normal distribution of N(0, 1/q);
   computing, by a FJLT hash value generator, a multiplication MHDx; and
   outputting, by the FJLT hash value generator, the hash value of the input vector x based on MHDx.

2. The method of claim 1, further comprising:
   receiving, by a query receiver, a query originated by a user;
   retrieving, by a query hit selector, the archived input data from the inventory database based on the value of the index;
   generating a response to the query based on the retrieved archived input data, which is selected based on a similarity measured between a second index value computed from the query and the value of the index for the archived input data; and
   transmitting the response to the user to respond to the query.

3. The method of claim 1, wherein
   the hash value of the input vector x is determined based on the sign of the multiplication MHDx; and
   the value of q is determined either empirically or based on an operational parameter δ.

4. The method of claim 1, wherein the step of outputting comprises:
   obtaining, by a B vector generator, a k dimensional vector where each coordinate of the B vector is drawn from a uniform distribution over [0, w];
   computing, by the FJLT hash value generator, (MHDx+B)/w, as the hash value of the input vector x.

5. A method, implemented on a machine having at least one processor, storage, and a communication platform making a connection to a network for information search, comprising the steps of:
   receiving, by an input content receiver via the communication platform, input data from one or more data sources;
   analyzing, by an input processor, the input data to obtain an input feature vector characterizing an input vector x of d dimensions and comprising signs of features;
   generating, by an indexing unit, an index of the input data based on the input feature vector;
   archiving, by an archiving unit, the input data in an inventory database based on a value of the index, wherein the value of the index for the input data is computed based on a similarity hash (SimHash++) process comprising the steps of:
   randomly flipping the signs of the features in the input feature vector to obtain a flipped vector,
   applying a first Hadamard transformation to the flipped vector to obtain a first transformed vector,
   multiplying the first transformed vector with an independent Gaussian transformation to obtain a second transformed vector,
   applying a second Hadamard transformation to the second transformed vector to form a base vector,
   determining the value of the index for the input data based on the base vector; and wherein the value of index corresponds to a hash value based on the steps of:
   obtaining, a multiplication HDx of the input vector x, via a fast Walsh-Hadamard transform (FWHT) Hx obtained based on a Hadamard matrix H as well as a diagonal matrix D comprising elements $D_{ii}$, where both the Hadamard matrix and the diagonal matrix D is d×d dimension and each element $D_{ii}$ in the diagonal matrix D is a Bernoulli random variable;
   obtaining, by a G matrix generator, a d×d diagonal Gaussian matrix G comprising elements $G_{ii}$, where each diagonal element $G_{ii}$ in the diagonal Gaussian matrix G, is an independently distributed random variable drawn from a normal distribution N(0,1);
   obtaining, by a P matrix generator, a random permutation matrix P; and
   outputting, by a hash value generator, the hash value of the input vector x based on HGPHDx.

6. The method of claim 5, further comprising:
   receiving, by a query receiver, a query originated by a user;
   retrieving, by a query hit selector, the archived input data from the inventory database based on the value of the index for the archived input data;

generating a response to the query based on the retrieved archived input data based on the value of the index for the archived input data, where the retrieval is made based on similarity between the query and the archived input data determined based on a value of the index for the query and the value of the index for the archived input data; and transmitting the response to the user to respond to the query.

7. The method of claim 5, wherein the hash value of the input vector x further comprises a concatenation of k signs sampled from sign (HGPHDx).

8. The method of claim 7, wherein the step of outputting comprises the steps of:

obtaining, by a V vector generator, a k dimensional vector of identically and independently distributed random variables drawn from a uniform distribution over [0, w]; and computing, by the hash value generator, (HGPHDx+V)/w, as the hash value of the input vector x.

9. The method of claim 7, wherein the step of outputting comprises the steps of:

obtaining, by a V vector generator, a k dimensional vector of identically and independently distributed random variables drawn from a uniform distribution over [0, w]; and computing the hash value z, where z=(HGPHDx+V)/w; and computing a plurality of hash values, each of which equals to k values sampled from z and is a component of the hash value.

* * * * *